(12) United States Patent
Takahashi et al.

(10) Patent No.: US 9,377,969 B2
(45) Date of Patent: Jun. 28, 2016

(54) INFORMATION PROCESSING DEVICE, INFORMATION PROCESSING METHOD, AND INFORMATION STORAGE MEDIUM, INCLUDING STORAGE OF INFORMATION INDICATING WHICH MEDIUM AMONG PLURAL MEDIA HAS A RECORDING FAILURE AREA AND A POSITION IN THE MEDIUM OF THE RECORDING FAILURE AREA

(71) Applicant: Panasonic Corporation, Osaka (JP)

(72) Inventors: Yoshihisa Takahashi, Osaka (JP); Kenji Takauchi, Osaka (JP); Atsushi Kiyomura, Osaka (JP); Makoto Usui, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 135 days.

(21) Appl. No.: 14/114,834

(22) PCT Filed: Mar. 15, 2013

(86) PCT No.: PCT/JP2013/001791
§ 371 (c)(1),
(2) Date: Oct. 30, 2013

(87) PCT Pub. No.: WO2013/145617
PCT Pub. Date: Oct. 3, 2013

(65) Prior Publication Data
US 2014/0075116 A1    Mar. 13, 2014

(30) Foreign Application Priority Data
Mar. 29, 2012 (JP) .................................. 2012-075751

(51) Int. Cl.
*G06F 12/00* (2006.01)
*G06F 3/06* (2006.01)
(Continued)

(52) U.S. Cl.
CPC ............ *G06F 3/0689* (2013.01); *G06F 3/0619* (2013.01); *G06F 3/0665* (2013.01);
(Continued)

(58) Field of Classification Search
USPC ......................................................... 711/114
See application file for complete search history.

(56) References Cited

U.S. PATENT DOCUMENTS

| 5,913,927 | A  | * | 6/1999  | Nagaraj | ............... | G06F 11/1092 |
|-----------|----|---|---------|---------|----------------|--------------|
|           |    |   |         |         |                | 711/114      |
| 7,640,452 | B2 | * | 12/2009 | Chen    | ...................| G06F 11/1084 |
|           |    |   |         |         |                | 714/43       |

(Continued)

FOREIGN PATENT DOCUMENTS

| JP | 7-36632     | 2/1995 |
| JP | 2007-18562  | 1/2007 |

(Continued)

OTHER PUBLICATIONS

International Search Report issued Apr. 23, 2013 in International (PCT) Application No. PCT/JP2013/001791.

*Primary Examiner* — Prasith Thammavong
(74) *Attorney, Agent, or Firm* — Wenderoth, Lind & Ponack, L.L.P.

(57) ABSTRACT

Recording failure area information includes information indicating an optical disk having a recording failure area in which data is missing, and indicating a position of the recording failure area in the optical disk, out of the optical disks constituting a disk array. A controller (110) includes a recording controller (121) which records data in data blocks of the optical disks by striping the data, and records, in at least one parity block, at least one parity data for use in recovering data in a data block in which the data is missing, out of the data blocks; and a management information updater (125) which records recording failure area information in a management information area of at least one of the optical disks, in the case where data is missing in at least one of optical disk drives at the time of data recording.

10 Claims, 17 Drawing Sheets

(51) Int. Cl.
*G06F 11/14* (2006.01)
*G06F 11/07* (2006.01)
*G06F 11/10* (2006.01)

(52) U.S. Cl.
CPC ........ *G06F11/0727* (2013.01); *G06F 11/0787* (2013.01); *G06F 11/1076* (2013.01); *G06F 11/1446* (2013.01); *G06F 3/0677* (2013.01); *G06F 2211/1057* (2013.01); *G06F 2211/1059* (2013.01); *G06F 2211/1076* (2013.01)

(56) References Cited

U.S. PATENT DOCUMENTS

| | | | |
|---|---|---|---|
| 7,725,664 B2 * | 5/2010 | Daikokuya | G06F 9/4411 711/112 |
| 2003/0140204 A1 * | 7/2003 | Ashton et al. | 711/162 |
| 2003/0200388 A1 * | 10/2003 | Hetrick | 711/114 |
| 2005/0076260 A1 * | 4/2005 | Hung | G06F 11/1092 714/6.12 |
| 2006/0206752 A1 * | 9/2006 | Ikeuchi et al. | 714/6 |
| 2007/0280074 A1 | 12/2007 | Fuchiwaki | |
| 2008/0114931 A1 * | 5/2008 | Aoki | G06F 3/0611 711/114 |
| 2008/0256420 A1 * | 10/2008 | Hafner et al. | 714/770 |
| 2009/0259882 A1 * | 10/2009 | Shellhamer | 714/7 |

FOREIGN PATENT DOCUMENTS

| | | |
|---|---|---|
| JP | 2007-328831 | 12/2007 |
| JP | 2012-14761 | 1/2012 |
| JP | 2013-54792 | 3/2013 |

* cited by examiner

FIG. 7

| RAID #n INFORMATION 45 | RAID #0 (OPTICAL DISK 1a) | RAID #1 (OPTICAL DISK 1b) | RAID #2 (OPTICAL DISK 1c) | RAID #3 (OPTICAL DISK 1d) |
|---|---|---|---|---|
| DRIVE UNIQUE ID 70 | DRV010 | DRV011 | DRV012 | DRV013 |
| DRIVE STATE 71 | NORMAL | NORMAL | NORMAL | NORMAL |
| DISK UNIQUE ID 72 | MD100 | MD101 | MD102 | MD103 |
| DISK STATE 73 | NORMAL | FATAL ← CAN RECOGNIZE THAT RECORDING FAILURE AREA IS INCLUDED | NORMAL | NORMAL |

FIG. 9

| TRACK INFORMATION 80 | RAID #0 (OPTICAL DISK 1a) | RAID #1 (OPTICAL DISK 1b) | RAID #2 (OPTICAL DISK 1c) | RAID #3 (OPTICAL DISK 1d) |
|---|---|---|---|---|
| TRACK NUMBER 81 | 0 | 0 | 0 | 0 |
| TRACK STATE 82 | Open | Open | Open | Open |
| LEADING ADDRESS (lba) 83 | 0 | 0 | 0 | 0 |
| LRA (lba) 84 | 5 | 2 | 5 | 5 |
| NWA (lba) 85 | 6 | 3 | 6 | 6 |
| REMAINING SIZE 86 | 3 | 6 | 3 | 3 |

DIFFERENT VALUES FROM VALUES OF OTHER DISKS = RECORDING FAILURE AREA (AREA REQUIRING DATA RECOVERY)

| TRACK INFORMATION 80 | RAID #0 (OPTICAL DISK 1a) | | RAID #1 (OPTICAL DISK 1b) | | RAID #1 (OPTICAL DISK 1b) | | RAID #2 (OPTICAL DISK 1c) | | RAID #3 (OPTICAL DISK 1d) | |
|---|---|---|---|---|---|---|---|---|---|---|
| TRACK NUMBER 81 | 0 | 1 | 0 | 1 | 0 | 1 | 0 | 1 | 0 | 1 |
| TRACK STATE 82 | Close | Open | Open | Open | Close | Open | Close | Open |
| LEADING ADDRESS (lba) 83 | 0 | 6 | 0 | 6 | 0 | 6 | 0 | 6 |
| LRA (lba) 84 | 5 | — | (2) | — | 5 | — | 5 | — |
| NWA (lba) 85 | — | 6 | (3) | 6 | — | 6 | — | 6 |
| REMAINING SIZE 86 | — | 3 | (3) | 3 | — | 3 | — | 3 |

DIFFERENT VALUES AND STATES FROM VALUES AND STATES OF OTHER DISKS = RECORDING FAILURE AREA (AREA REQUIRING DATA RECOVERY)

INFORMATION PROCESSING DEVICE, INFORMATION PROCESSING METHOD, AND INFORMATION STORAGE MEDIUM, INCLUDING STORAGE OF INFORMATION INDICATING WHICH MEDIUM AMONG PLURAL MEDIA HAS A RECORDING FAILURE AREA AND A POSITION IN THE MEDIUM OF THE RECORDING FAILURE AREA

TECHNICAL FIELD

The present invention relates to an information processing device and an information processing method for recording data in a disk array constituted of a plurality of portable information storage media such as optical disks, and a portable information storage medium for recording data.

BACKGROUND ART

There is known a disk array device, as an external storage device, for use in a large-scale business-use server or other computer systems, for implementing large-capacity and high-speed processing, and improved fault-tolerance. The disk array device is a system, in which a group of disks are utilized like one disk (one volume). In the following, a virtual disk constituted of a group of disks to be implemented by a disk array is called as a logical disk.

In a disk array device, a level of RAID (Redundant Arrays of Inexpensive Disks) to be used is selected according to a required reliability, speed, and use efficiency. Examples of the often used RAID levels are RAID 0 only having a striping function of recording one data in a plurality of disks by distributing the data, RAID 1 having a mirroring function, RAID 5 in which user data and parity data calculated on the basis of a block are recorded by distributing (striping) the data, and RAID 6 in which user data and two kinds of parity data calculated on the basis of a block are recorded by distributing (striping) the data. Further, there is also used a configuration in which these RAID levels are combined with each other, for instance, RAID 10 in which a group of data subjected to mirroring is subjected to striping.

In this example, there is described RAID 6, which is often used in a situation that a certain speed and use efficiency are required, while securing a certain degree of redundancy.

FIG. 17 is a diagram for describing a conventional RAID 6 system. FIG. 17 shows an example of a RAID 6 system employing P+Q method, which is constituted of four disk devices 201 to 204. Regarding the four disk devices 201 to 204 constituting a RAID, the first disk device 201, the second disk device 202, the third disk device 203, and the fourth disk device 204 are respectively defined as RAID#0, RAID#1, RAID#2, and RAID#3. In a disk array constituted of the four disk devices as a group having one volume, the logical address seen from a host device is assigned in the order of RAID#0, RAID#1, RAID#2, and RAID#3 except for the parity data.

In a RAID, the storage area of each of the disk devices is managed by dividing the storage area into blocks each having the same size as the size of a logical sector, or blocks each having the size equal to the multiple number of the size of a logical sector. Referring to FIG. 17, blocks Ai, Bi, Pi, Qi (i=1, 2, 3, ...) constitute one stripe. The block Pi and the block Qi are parity blocks. In the block Pi, a computation result on an exclusive OR of data at the same byte position as the block Ai and the block Bi is stored. In the block Qi, a computation result (also called as RS syndrome or Galois parity) given by a generating polynomial is stored. In other words, a stripe is constituted of data blocks such as the block Ai and the block Bi, and parity blocks such as the block Pi and the block Qi.

As an example of a parity generation method of RAID 6, there is also known a 2D-XOR method for generating parities in a diagonal direction, in addition to the aforementioned P+Q method. In the following, the P+Q method is described as an example of the parity generation method of RAID 6 in the present specification.

In RAID 6, it is possible to recover stripe data, even in the case where data cannot be reproduced resulting from failure of two or less disk devices, for instance. Further, even in the case where a recording operation or a reproducing operation cannot be performed resulting from failure of one disk device, for instance, it is possible to continuously perform a recording operation or a reproducing operation with the degree of redundancy substantially the same as RAID 5 having one parity block. For instance, referring to FIG. 17, let it be assumed that a reproducing operation cannot be performed resulting from failure of the first disk device 201. Then, it is possible to recover the block A1 by computing an exclusive OR of data at the same byte position as of the block B1 and the block P1.

In the thus configured disk array device, there is also used a system incorporated with a portable media storage device as an external storage device. In a system incorporated with a portable media storage device, there is used a library device provided with a housing body which houses multitudes of information storage media, one or more recording/reproducing devices (drive devices) which read and write data, and a transporter such as a changer which transports the information storage media between the housing body and the recording/reproducing devices. Such an array system configured of a plurality of recording/reproducing devices is also called as RAIL (Redundant Arrays of Inexpensive Libraries).

In recent years, the amount of data to be stored in a large scale data center is drastically increasing. As such a data amount is increasing, the amount of data which is less likely to be referred to tends to increase. There is a demand for a portable media library device capable of reducing the electric power consumption and suitable for a long time storage, as a device which archives the data whose number of times of reference is small.

As a representative example of a portable information storage medium, there is known an optical disk such as a DVD (Digital Versatile Disc) or a Blu-ray Disc. Optical disks are roughly classified into rewritable information storage media such as DVD-RAMs and BD-REs, and write-once information storage media such as DVD-Rs, DVD+Rs, and BD-Rs.

As the large-capacity optical disks have been developed in recent years, there is an increasing opportunity of using inexpensive write-once information storage media for archiving data whose number of times of reference is small. An optical disk has a spare recording area called as a spare area in order to enhance data reliability. A recording/reproducing device is also provided with a function of performing a replacement recording operation of data in a defect block into a block within a spare area.

In a portable media library array device, constituting a RAID of information storage media sets which are loaded in a plurality of recording/reproducing devices (drive devices) provided in the library array device, and exchanging the information storage media loaded in the drive devices one after another makes it possible to use the information storage media by the number of information storage media sets larger than the number of drive devices.

There have been proposed various methods for continuously utilizing the recording/reproducing devices or the information storage media as an array device for recording or reproducing (in other words, for enhancing the usability), even in the case where failure has occurred in one of the recording/reproducing devices (drive devices) or in one of the information storage media (disks), and it is impossible to continuously utilize the recording/reproducing device or the information storage medium for a recording operation or a reproducing operation. For instance, there has been proposed a method for recovering data with use of a spare drive device (hot spare), in the case where failure has occurred in a certain drive device, or in the case where failure has occurred in a disk loaded in a drive device in an array device provided with the spare drive device loaded with a spare information storage medium. Further, there has also been proposed a method for continuously performing a recording operation or a reproducing operation without data recovery by moving a disk loaded in a failed drive device to a spare drive device, in the case where it is recognized that failure has occurred in the drive device (see e.g. patent literature 1).

Further, there has also been proposed, as a method for securing a transfer rate at the time of reproduction while securing usability, a method for stabilizing the transfer rate at the time of reproduction by returning dummy data without performing replacement processing with respect to a defect block in which a replacement recording operation has been performed, and by performing data recovery using parity data in an array device using portable information storage media such as optical disks (see e.g. patent literature 2).

However, in the case where a hot spare is provided as a spare member for a failed drive device or for a failed disk, the disk array device itself may be increased in size. This is not suitable for a data center in which a compact device is required.

Further, the conventional disk array device has not been made, taking into full consideration of a disk array device utilizing information storage media such as optical disks as a disk array (e.g. RAID 6).

For instance, let us consider a case, in which failure has occurred in one of a plurality of recording/reproducing devices constituting RAID 6. In the case of RAID 6, even if failure has occurred in one of the recording/reproducing devices, it may be preferable to continuously record or reproduce data in the aspect of usability, because the degree of redundancy corresponding to RAID 5 provided with one parity block is maintained. In the case where the disk array device is continuously used in such a state, a recording operation into an information storage medium loaded in the failed recording/reproducing device is not performed. As a result, an area corresponding to a stripe which has been recorded at a time after the failure occurrence may be brought to an unrecorded state (which may occur both in a rewritable information storage medium and in a write-once information storage medium), or may remain in a state that the data before the recording operation is left (which may occur only in a rewritable information storage medium) in the information storage medium loaded in the failed recording/reproducing device.

In many cases, a recording/reproducing device (drive device) for an optical disk such as BD-RE or BD-R is provided with a function of reporting (transferring) "00" data (dummy data) to a host device in response to a reproduction request onto an unrecorded area (e.g. see paragraph [0006] of patent literature 3). In other words, data other than the recorded data may be accurately read from an area (such as an unrecorded area) of an information storage medium, in which a recording operation has not been performed and in which a recording operation is not performed any more, against the user's intention. There is a case that "00" data is actually recorded. Accordingly, it is impossible to simply handle "00" data as invalid data. Further, in an HDD (hard disk drive) frequently used in a conventional disk array device, preformat recording is performed in order to detect a defect block at the time of shipment of the products. Therefore, in the field of magnetic disks, there is no problem to be solved regarding an unrecorded state, which may occur in optical disks as described above.

As one of the measures for solving the problem, there is proposed a method, in which an information storage medium loaded in a failed recording/reproducing device is not used for a recording operation or a reproducing operation after the time of failure occurrence at least for a period of time until data recovery is completed. This is substantially the same control method as used in a disk (media)/drive integrated HDD, which has been often used in a conventional disk array device.

Use of the above method, however, may lead to a state that the information storage medium is not used any more, regardless of a fact that the information storage medium can be used in a normal state. If such a situation is continued, the information storage medium loaded in the failed recording/reproducing device may not be used in reproducing data from an area, in which a recording operation has been accurately performed while maintaining the degree of redundancy of RAID 6. As a result, the degree of redundancy at the time of reproduction may constantly remain in a state corresponding to RAID5 having one parity block. If reproduction from two or more information storage media has failed with respect to the same stripe in the above situation, a data reproducing operation cannot be performed (data may be inaccessible). This is not preferable as a disk array device requiring high reliability.

In particular, in information storage media such as optical disks, defects may be present substantially at the same position as each other among the information storage media manufactured as a lot (in one manufacturing process). Accordingly, a recording operation or a reproducing operation may fail substantially at the same position on the information storage media. In view of the above, there is a demand for continuously using information storage media in a state that a high degree of redundancy (data reliability) is maintained at the time of recording or at the time of reproduction as much as possible.

Further, in the case of a disk array device using portable information storage media such as optical disks, it is often the case that the information storage media having recorded data are unloaded from the disk array device and managed by off-line by e.g. shelf management. In view of the above, it is presumed that prompt data recovery may be physically difficult. In such a case, it is highly likely that block data which has not been accurately recorded may remain without recovery for a long period of time.

As another problem to be solved, in the case of a disk array device using information storage media such as optical disks, there is a case that the order of an optical disk set constituting a RAID (disk array) may be changed at a timing such as repair of failure or maintenance. In such a case, if a RAID is constituted by fixedly assigning the RAID number to each of the recording/reproducing devices, the RAID numbers of the information storage media may be changed in the course of use, which may make recording control or reproduction control extremely complicated. In view of the above, it is desirable to configure a system capable of continuously using information storage media as a RAID, even if the order of the information storage media is changed in the course of use.

CITATION LIST

Patent Literature

Patent literature 1: JP Hei 7-36632A
Patent literature 2: JP 2012-14761A
Patent literature 3: JP 2007-328831A

SUMMARY OF INVENTION

In view of the above, an object of the invention is to provide an information processing device, an information processing method, and an information storage medium that enable to secure high data reliability, high usability, and a high transfer rate, and enable to continuously record data, even before missing data is recovered.

An information processing device according to an aspect of the invention is an information processing device for recording data in a disk array configured of a plurality of portable information storage media. The information processing device is provided with a plurality of drive devices which respectively record the data in the plurality of the information storage media; and a control section which controls the plurality of the drive devices for recording the data in the disk array by striping the data. Each of the plurality of the information storage media includes a user area having a plurality of data blocks for recording the data on the basis of the data block, and a management information area in which recording failure area information is recorded, the recording failure area information indicating information relating to a recording failure area in which the data is missing. The recording failure area information includes information indicating the information storage medium having the recording failure area, and indicating a position of the recording failure area in the information storage medium, out of the plurality of the information storage media constituting the disk array. The control section includes a data recording section which records the data in the plurality of the data blocks of the plurality of the information storage media by striping the data, and records, in at least one parity block, at least one parity data for use in recovering data in the data block in which the data is missing, out of the plurality of the data blocks, and an area information recording section which records, in a case where recording has failed in at least one of the drive devices at a time of recording the data, the recording failure area information in the management information area of at least one of the information storage media.

According to the above configuration, the plurality of the drive devices respectively record data in the plurality of the information storage media. The control section controls the plurality of the drive devices for recording the data in the disk array by striping the data. Each of the plurality of the information storage media includes a user area having a plurality of data blocks for recording the data on the basis of the data block, and a management information area in which recording failure area information is recorded, the recording failure area information indicating information relating to a recording failure area in which the data is missing. The recording failure area information includes information indicating the information storage medium having the recording failure area, and indicating a position of the recording failure area in the information storage medium, out of the plurality of the information storage media constituting the disk array. The data recording section records the data in the plurality of the data blocks of the plurality of the information storage media by striping the data, and records, in at least one parity block, at least one parity data for use in recovering data in the data block in which the data is missing, out of the plurality of the data blocks. The area information recording section records, in a case where recording has failed in at least one of the drive devices at a time of recording the data, the recording failure area information in the management information area of at least one of the information storage media.

According to the invention, there is recorded recording failure area information including information indicating an information storage medium having a recording failure area in which data is missing, and indicating a position of the recording failure area in the information storage medium, out of a plurality of information storage media constituting a disk array. Accordingly, the above configuration is advantageous in securing high data reliability, high usability, and a high transfer rate, and in continuously recording data, even before missing data is recovered.

These and other objects, features and advantages of the present invention will become more apparent upon reading the following detailed description along with the accompanying drawings.

BRIEF DESCRIPTION OF DRAWINGS

FIG. 7 is a diagram showing RAID information to be included in RAID configuration information;

FIG. 9 is a diagram showing a practical example of track information in each of the four optical disks in the state of FIG. 5;

DESCRIPTION OF EMBODIMENTS

Figure 1:
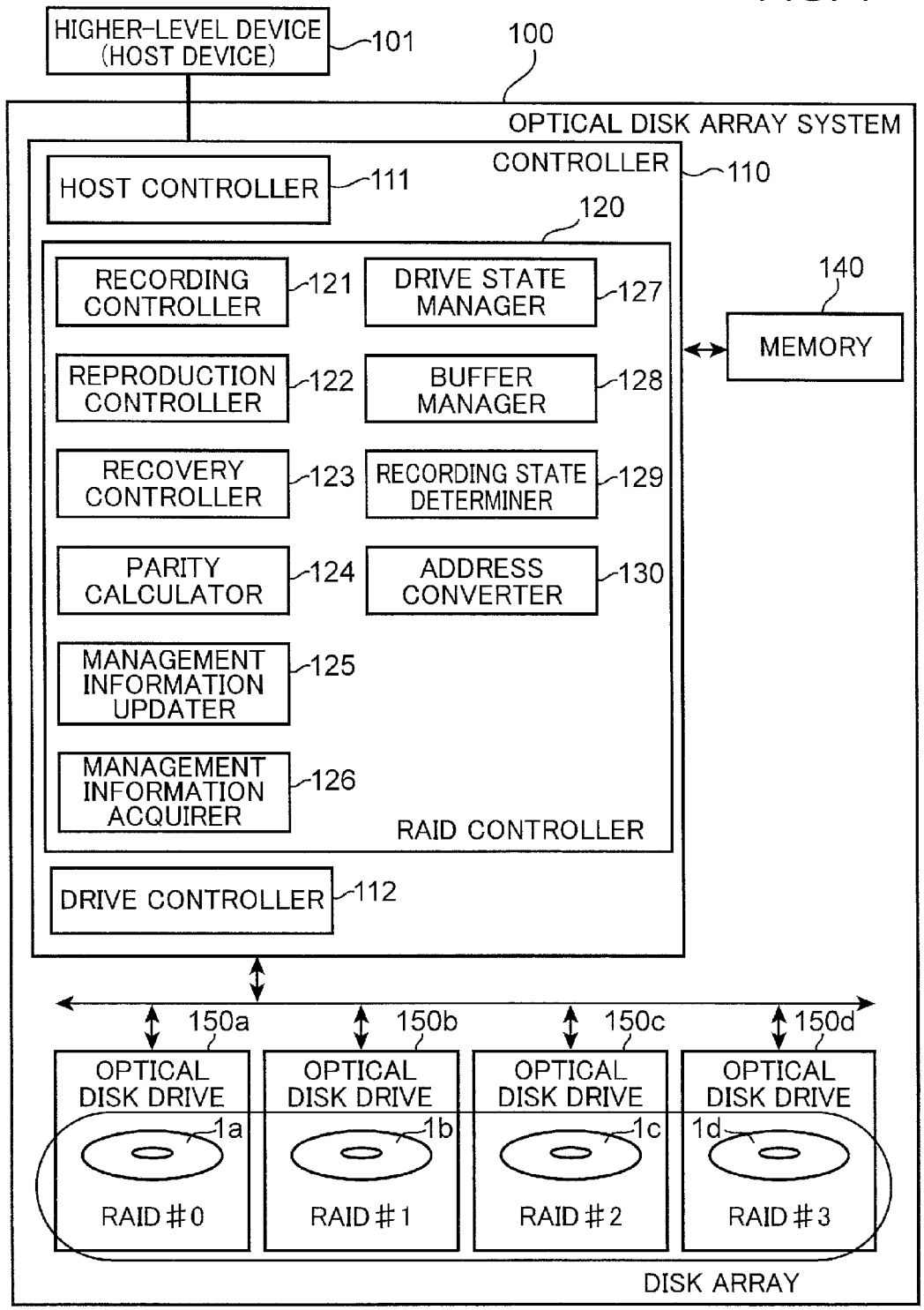
FIG. 1 is a block diagram showing a configuration of an optical disk array system according to an embodiment of the invention.

In the following, an embodiment of the invention will be described referring to the drawings. The following embodiment is an example embodying the invention, and does not limit the technical range of the invention.

In the embodiment of the invention, description is made by taking an example of an array system using write-once optical disks such as BD-Rs as information storage media.

Further, regarding the array system, description is made by taking an example of RAID 6 configured such that four optical disk recording/reproducing devices (drive devices) are operated in parallel, and two of the four drive devices are used as parity drive devices in order to enhance reliability of the system and data.

(1) Configuration of Optical Disk Array System

In the following, a configuration of an optical disk array system 100 according to the embodiment of the invention is briefly described.

FIG. 1 is a block diagram showing a configuration of the optical disk array system 100 according to the embodiment of the invention. The optical disk array system 100 records data in a disk array constituted of a plurality of portable optical disks 1a to 1d.

The optical disk array system 100 is connected to a higher-level device 101 as a host device via an interface cable such as a SAS (Serial Attached SCSI) or a FC (Fiber Channel). The higher-level device 101 is e.g. a server computer.

The optical disk array system 100 is provided with a controller 110, a memory 140, and a plurality of optical disk drives 150a to 150d. The controller 110, the memory 140, and the optical disk drives 150a to 150d are connected by an I/O bus such as a SATA (Serial ATA).

The memory 140 is used as a cache memory which temporarily holds recorded data to be transmitted to the higher-level device (host device) 101, or reproduced data to be received from the higher-level device (host device) 101. Further, the memory 140 is used for storing other information (such as management information on the optical disks 1a to 1d, or management information relating to a RAID). The memory 140 is basically constituted of a volatile memory such as a DRAM (Dynamic Random Access Memory).

The optical disc drives 150a to 150d record data in the respective corresponding optical disks 1a to 1d. Further, the optical disk drives 150a to 150d reproduce data from the respective corresponding optical disks 1a to 1d. The optical disk drives 150a to 150d are recording/reproducing devices which record or reproduce data requested from the higher-level device (host device) 101 with respect to the optical disks 1a to 1d. As described above, in the embodiment of the invention, the four optical disk drives 150a to 150d (four optical disks 1a to 1d) constitute a disk array. Accordingly, the four optical disk drives 150a to 150d shown in FIG. 1 are connected to the controller 110.

Further, the optical disks 1a to 1d are loaded in the respective corresponding optical disk drives 150a to 150d. For instance, as shown in FIG. 1, the optical disk 1a is loaded in the optical disk drive 150a, the optical disk 1b is loaded in the optical disk drive 150b, the optical disk 1c is loaded in the optical disk drive 150c, and the optical disk 1d is loaded in the optical disk drive 150d. The four optical disks 1a to 1d constitute a disk array, and data is recorded or reproduced by a RAID 6 system.

Each of the optical disks 1a to 1d includes a user area having a plurality of data blocks for recording data on the basis of a data block, and a management information area for recording management information including recording failure area information indicating information relating to a recording failure area in which data is missing. The recording failure area information includes information indicating an optical disk having a recording failure area, and indicating the position of the recording failure area in the optical disk, out of the optical disks 1a to 1d constituting a disk array. Further, the recording failure area includes at least one of a data block in which a recording error has occurred, and a data block in which data has not been recorded.

In this embodiment, the optical disks 1a to 1d are respectively loaded in the optical disks 150a to 150d. The invention is not specifically limited to the above. It is also possible to configure the recording/reproducing device to have a disk changer capable of loading a plurality of optical disks at the same time.

The four optical disks 1a to 1d constituting a disk array (RAID) may be stored and managed in one magazine (not shown), for instance. In this example, a magazine is a cartridge capable of storing a plurality of optical disks as a lot. Recording or reproducing data as a RAID with respect to a plurality of optical disks stored in one magazine makes it easy for the user to handle the optical disks, and is advantageous in reducing a risk of losing the optical disks constituting the RAID, for instance. Further, the above configuration is also advantageous in preventing a situation that the user may find it difficult to know the combination of the optical disks constituting a RAID, in the case where the number of optical disks having recorded data is extremely large resulting from use of the optical disk array system 100 for a long period of time.

Further, it is also possible to mount an accessory information memory such as a RFID (Radio Frequency Identification) tag or a barcode on a magazine, for instance. The above configuration is advantageous in recognizing the RAID level of a disk array constituted of optical disks within a magazine, the data recording date, or a data (file) list, with use of a RFID reader or a barcode reader, in the case where the magazine is managed by off-line by shelf management on the outside of the optical disk array system 100.

The optical disk array system 100 may be mountable with a plurality of magazines. Further, the optical disk array system 100 may be provided with a transporter, i.e., a changer mechanism (not shown) for changing between the magazines in order to load or unload the optical disks stored in each of the magazines to or from the optical disk drives 150a to 150d.

In the following, the embodiment of the invention is described based on the premise that the four optical disks 1a to 1d constituting a RAID in the optical disk array system 100 are stored and managed in one magazine.

The controller 110 controls the optical disk drives 150a to 150d for recording data in a disk array by striping the data. Further, the controller 110 controls the optical disk drives 150a to 150d for reproducing data from the disk array. The controller 110 is provided with a host controller 111, a drive controller 112, and a RAID controller 120. The controller 110 is constituted of e.g. a CPU (Central Processing Unit).

The host controller 111 performs control in response to a processing request (command) from the higher-level device (host device) 101, performs protocol control according to an interface such as a SAS or a FC, or performs data transfer control.

The drive controller 112 controls the optical disk drives 150a to 150d provided in the optical disk array system 100.

The RAID controller 120 controls to handle the optical disk drives 150a to 150d provided in the optical disk array system 100 as a disk array (RAID). The RAID controller 120 is provided with a recording controller 121, a reproduction controller 122, a recovery controller 123, a parity calculator 124, a management information updater 125, a management information acquirer 126, a drive state manager 127, a buffer manager 128, a recording state determiner 129, and an address converter 130.

The recording controller 121 records data in the data blocks of each of the optical disks 1a to 1d by striping the data, and records, into at least one parity block, at least one parity data for use in recovering data in a data block in which data is missing, out of the data blocks.

The recording controller 121 mainly controls recording processing as a RAID. The recording controller 121 records data, of which recording has been requested from the higher-level device 101, with respect to the optical disk drives 150a to 150d (optical disks 1a to 1d) as necessary by striping the data according to the RAID level (e.g. RAID 6 having two parity blocks within a stripe). In performing the above operation, the address converter 130 calculates a data recording position in each of the optical disks 1a to 1d. Further, the buffer manager 128 executes management of recorded data with respect to the memory 140. Further, the parity calculator 124 computes and calculates parity data of the RAID.

The reproduction controller 122 invalidates the data read from a recording failure area, based on the recording failure area information, and reproduces the data in the recording failure area with use of at least parity data.

The reproduction controller 122 mainly controls reproduction processing as a RAID. The reproduction controller 122 reproduces the data, of which reproduction has been requested from the higher-level device, with respect to the optical disks 150a to 150d (optical disks 1a to 1d) as necessary according to the RAID level (e.g. RAID 6 having two parity blocks within a stripe). In performing the above operation, the address converter 130 calculates a data reproducing position in each of the optical disks 1a to 1d. Further, the buffer manager 128 executes management of reproduced data with respect to the memory 140. Further, the recovery controller 123 executes data recovery with use of parity data.

In this example, the parity block is a block for use in recovering data in a data block in which data is missing, even in the case where data in one of the data blocks is missing. The parity block contains parity data for use in data recovery.

The recovery controller 123 controls data recovery with use of parity data according to the RAID level with respect to an optical disk in a degraded state, in the case where the optical disk having a redundancy configuration by a RAID is brought to a degraded state, in other words, in the case where data recovery is necessary.

The embodiment of the invention is described based on the premise that the recovery controller 123 is a processor which performs data recovery with respect to an optical disk in a degraded state itself. However, the function of the recovery controller 123 is not limited to the above. The recovery controller 123 may perform processing such as data recovery with respect to another (brand new) optical disk, with use of the memory 140 provided in the optical disk array system 100, or with use of a memory provided in the higher-level device 101, for instance. Further, the optical disk array system 100 for recording or reproducing data may not be necessarily provided with the recovery controller 123.

The parity calculator 124 computes and generates parity data according to the RAID level.

The management information updater 125 records recording failure area information in a RAID management information area (management information area) of at least one optical disk, in the case where recording has failed in at least one optical disk drive at the time of data recording. Preferably, the management information updater 125 may record recording failure area information in the RAID management information areas (management information areas) of all the optical disks 1a to 1d at a predetermined timing.

The management information updater 125 generates RAID management information (array management information), and updates the RAID management information. More specifically, in the case where an unused (blank) optical disk is loaded, the management information updater 125 generates management information (RAID management information) relating to the disk array (RAID) according to the RAID level selected by the user, triggered by a user's designation, for instance, and records the generated RAID management information in at least one of the optical disks constituting the RAID. For instance, the management information updater 125 records the RAID management information in all the optical disks constituting the RAID. The RAID management information is recorded in a RAID management information area (array management information area) 21 to be described later.

Further, in the case where the contents of the RAID management information is changed with respect to an optical disk for which the RAID has already been configured, the management information updater 125 updates and records the RAID management information at an appropriate timing. In this example, an optical disk to be used is a write-once optical disk. In a write-once optical disk, information is continuously recorded on a track, and it is impossible to physically rewrite the information. In such a case, the management information updater 125 may implement logical rewritable recording by performing a replacement recording operation of the updated data, with use of a function called as pseudo overwrite (POW).

Recording of RAID management information in the RAID management information area 21 is executed e.g. immediately before an optical disk is ejected from an optical disk drive, or immediately after a recording error has occurred. In performing the above operation, the RAID management information to be recorded in the optical disk is stored in the memory 140, for instance. The RAID management information is described in the following section "(2) Area Structure of Optical Disk", and therefore, a detailed description thereof is omitted herein.

The management information acquirer 126 acquires (reads) the RAID management information from the RAID management information area 21 of an optical disk loaded in an optical disk drive. Specifically, the management information acquirer 126 acquires recording failure area information from the RAID management information area.

Further, the management information acquirer 126 also has a function of acquiring the RAID management information from all the optical disks having the recorded RAID management information, and of recovering proper RAID management information, in the case where mismatching has occurred. The management information acquirer 126 acquires the RAID management information from the RAID management information area 21 of at least one optical disk loaded in at least one optical disk drive. Reading of the RAID management information from the RAID management information area 21 is executed immediately after an optical disk is loaded in an optical disk drive and the optical disk drive is started up, for instance. The RAID management information read from the optical disk is stored in the memory 140, for instance.

The drive state manager 127 manages the respective states of the optical disk drives 150*a* to 150*d* constituting a disk array (RAID) provided in the optical disk array system 100, and the respective states of the optical disks 1*a* to 1*d* respectively loaded in the optical disk drives 150*a* to 150*d*.

In this example, the state of an optical disk drive includes a "normal state" in which a recording operation and a reproducing operation are enabled, a "recording disable state" in which only a recording operation is disabled resulting from an influence such as deterioration or failure of part of the components of an optical disk drive such as an optical pickup, and a "recording/reproduction disable state (=drive failure state)" in which both of a recording operation and a reproducing operation are disabled, and exchange of an optical disk drive is necessary.

Further, the state of an optical disk includes a "normal state", in which a recording operation and a reproducing operation are normally performed, a "degraded state" in which data is missing because recording has failed due to some reason, and data recovery is necessary, a "recording disable state" in which a recording operation is disabled because of shortage of a spare area, and a "disk failure state" in which a recording operation and a reproducing operation themselves are disabled because management information cannot be read, for instance. The RAID controller 120 determines an optical disk drive and an optical disk usable as a disk array (RAID), with use of these information.

The buffer manager 128 manages recorded data or reproduced data to be temporarily stored on the cache memory in the memory 140. Further, the buffer manager 128 also performs control such as discarding (invalidating) recorded data stored on the buffer, triggered by successful recording of data into an optical disk.

The recording state determiner 129 determines the presence or absence of a recording failure area in which data is missing because recording has failed resulting from an influence such as failure of an optical disk drive, and determines the position of the recording failure area. The details on the operation to be performed by the recording state determiner 129 will be described later in the section "(3) Method for Determining Recording Failure Area", and therefore, a detailed description thereof is omitted herein. In this example, a recording failure area is a block in which a recording error has occurred on an optical disk, or a block in which data has not been recorded, because of some reason concerning an optical disk drive as a recording/reproducing device or an optical disk as an information storage medium. In other words, the recording failure area is a block in which data is missing.

The address converter 130 converts address information of a logical disk to which a recording request or a reproduction request has been issued from the higher-level device (host device) 101, into address information on a corresponding optical disk. Regarding optical disks of the same type, defects may appear at a specific position or a specific area on the optical disks. In view of the above, it is effective to employ a recording method while offsetting a start position of a RAID data area 22 to be described later with respect to each of the optical disks. The address converter 130 is also operable to perform address conversion, taking into consideration of the offset size in each of the optical disks 1*a* to 1*d*, in the case where the data recording start position is offset with respect to each of the optical disks 1*a* to 1*d*.

In this example, the memory 140 is a volatile memory. Alternatively, the memory 140 may be a nonvolatile memory such as a SSD (Solid-State Drive). For instance, in the case where the optical disk array system 100 is mountable with a plurality of magazines, adjustment information relating to the magazines (such as states of the disks, or adjusted values e.g. an optimum recording power to be obtained by combination of the respective optical disk drives and the respective optical disks) is stored in the nonvolatile memory (in the memory 140) in correlation with the magazines. With this configuration, it is possible to shorten an exchange time (a startup time of an optical disk) required for exchanging the magazines for exchanging the optical disks. Further, the memory 140 is also usable as an area for storing an OS (Operating System) to be run on the optical disk array system 100.

In this embodiment, the optical disks 1*a* to 1*d* correspond to an example of a plurality of portable information storage media, the optical disk array system 100 corresponds to an example of an information processing device, the optical disk drives 150*a* to 150*d* correspond to an example of a plurality of drive devices, the controller 110 corresponds to an example of a control section, the recording controller 121 corresponds to an example of a data recording section, the management information updater 125 corresponds to an example of an area information recording section, the reproduction controller 122 corresponds to an example of a reproduction control section, and the management information acquirer 126 corresponds to an example of an information acquiring section.

(2) Area Structure of Optical Disk

Figure 2:
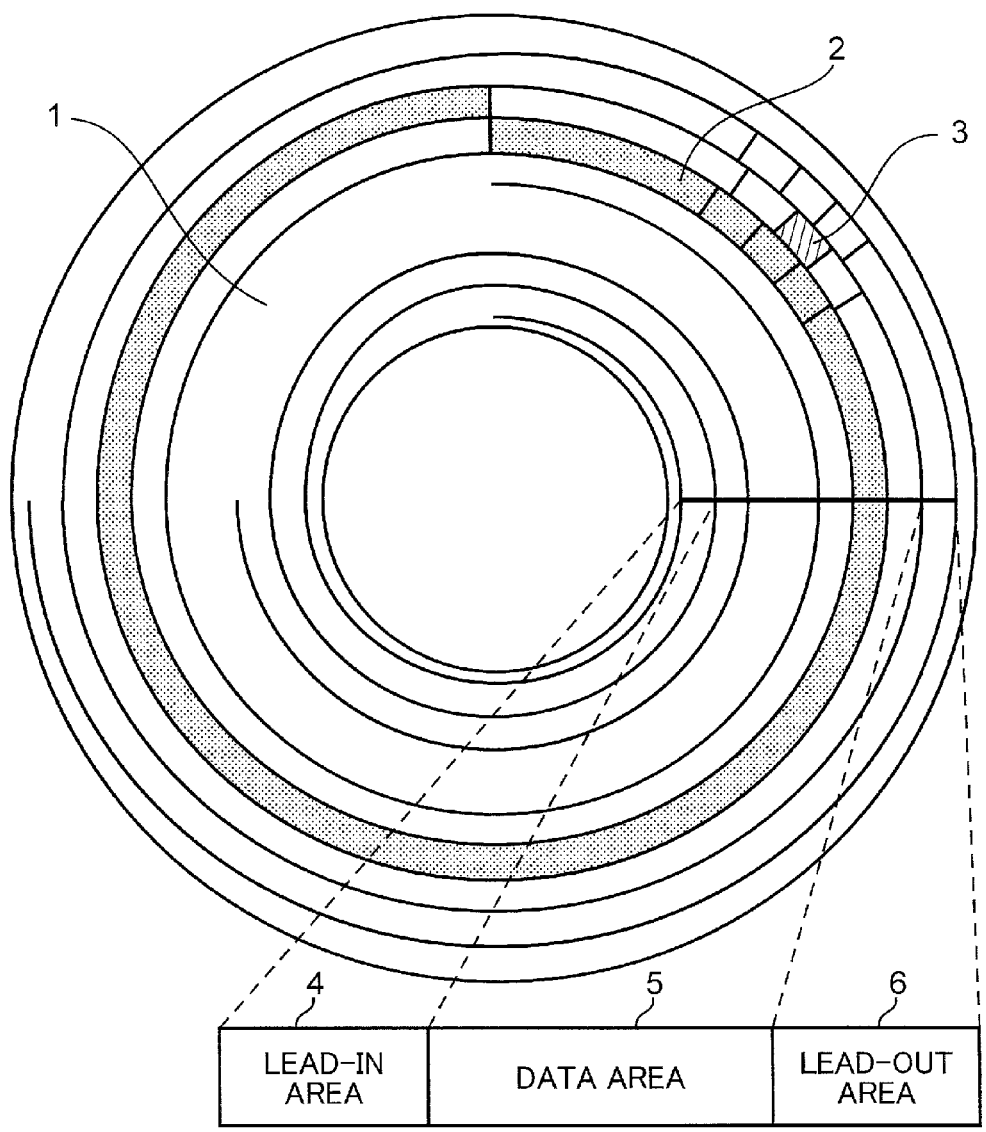
FIG. 2 is a configuration diagram showing areas on an optical disk according to the embodiment of the invention.

FIG. 2 is a configuration diagram of areas on an optical disk according to the embodiment of the invention. A number of tracks 2 are formed on a disc-shaped optical disk 1 in the form of a spiral. A number of clusters 3 are need on each of the tracks 2. The cluster 3 is an error correction unit, and is a minimum unit based on which a recording operation and a reproducing operation are performed. The cluster 3 may also be called as an ECC block or may be simply called as a block. For instance, in the case of BD (Blu-ray Disc), one cluster 3 is constituted of thirty-two sectors. Since one sector has 2 KByte, one cluster has 64 KByte.

On the optical disk 1, there are formed a plurality of laminated layers including a recording layer with respect to which data is recorded or reproduced. The recording layer of the optical disk 1 includes a lead-in area 4, a data area 5, and a lead-out area 6. User data is recorded or reproduced with respect to the data area 5. The lead-in area 4 and the lead-out area 6 play a role that an optical head (not shown) in an optical disk drive can follow the track 2 even if the optical head overruns, in the case where the optical head accesses an end of the data area 5. The lead-in area 4 and the lead-out area 6 are areas to which the user cannot directly access, and are provided with an area called as a DMA (Disc Management Area) or a TDMA (Temporary Disc Management Area), in which management information on the optical disk 1 is recorded.

In the case where the optical disk 1 is provided with two or more recording layers, an inner peripheral area of the optical disk 1 corresponding to the lead-in area 4 may be called as an inner zone, and an outer peripheral area of the optical disk 1 corresponding to the lead-out area 6 may be called as an outer zone.

Figure 3:
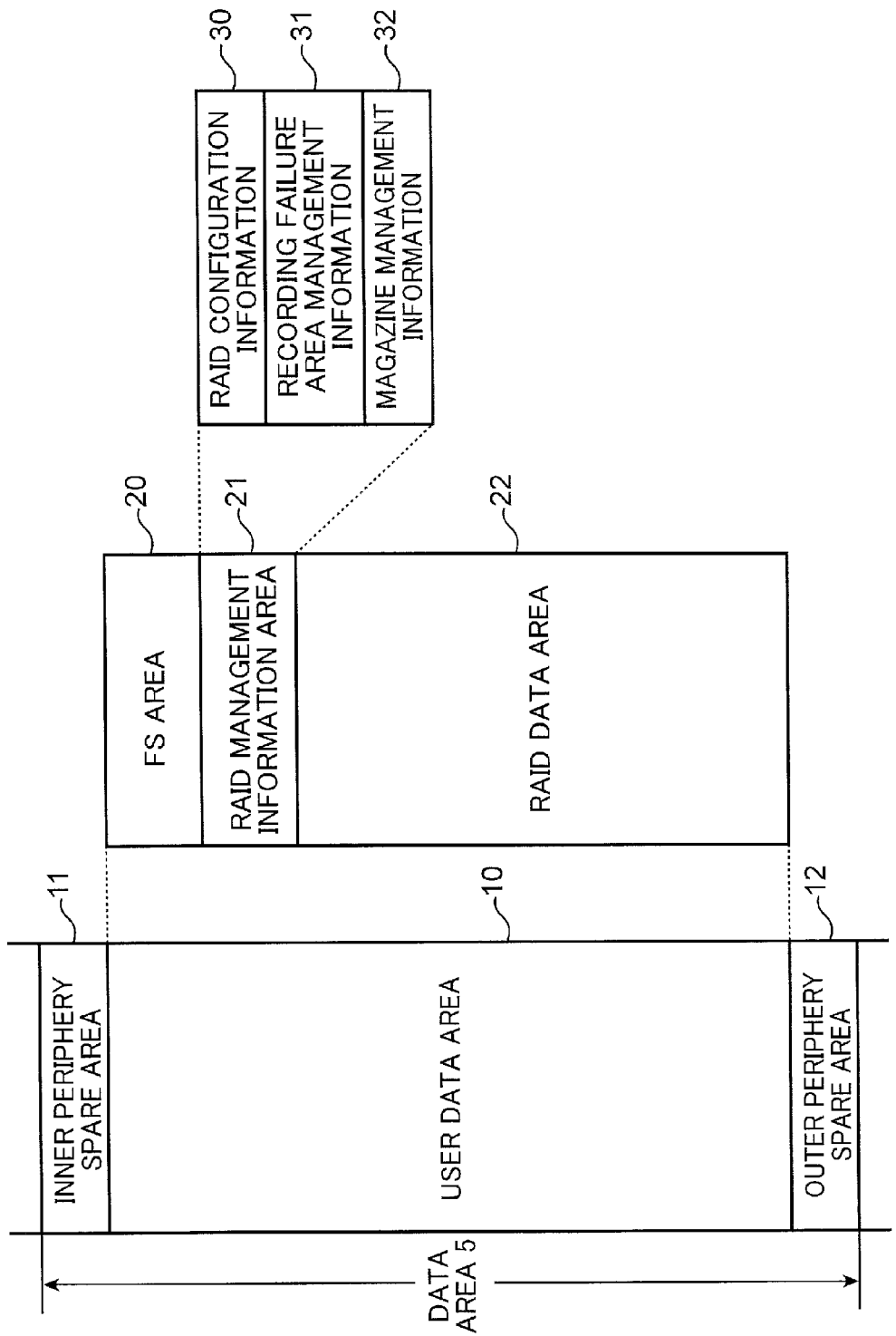
FIG. 3 is a diagram showing a detailed configuration of a data area in one of the optical disks constituting a RAID as a disk array.

FIG. 3 is a diagram showing a detailed configuration of the data area 5 in one of the optical disks constituting a RAID as a disk array.

The data area 5 includes a user data area 10, an inner periphery spare area 11, and an outer periphery spare area 12.

The user data area 10 is an area with respect to which user data is recorded or reproduced.

The inner periphery spare area 11 and the outer periphery spare area 12 are backup areas (spare areas) which are prepared in advance, as areas to which a replacement cluster (also called as a replacement destination cluster) is assigned, in place of a defect cluster within the user data area 10. The inner periphery spare area (hereinafter, also called as ISA) 11 is disposed on the inner periphery of the optical disk 1, and the outer periphery spare area (hereinafter, also called as OSA) 12 is disposed on the outer periphery of the optical disk 1. In this example, the ISA 11 and the OSA 12 may be assigned as an area such as a TDMA in which management information is recorded, in addition to a replacement area of a defect cluster. Further, the sizes of the ISA 11 and the OSA 12 are settable to any size by the user. It is also possible to configure the optical disk 1 such that the data area 5 is not provided with the ISA 11 and the OSA 12, in other words, it is possible to set the sizes of the ISA 11 and the OSA 12 to zero.

The user data area 10 further includes a FS area 20, the RAID management information area 21, and the RAID data area 22.

The FS (file system) area 20 is an area, in which file system information is recorded in order to facilitate reading of recorded data, even in the case where the optical disk 1 is loaded alone in a standard recording/reproducing device (optical disk drive) connected to a PC (Personal Computer). Providing the FS area 20 with the file system information makes it possible to handle the RAID management information area 21 or the RAID data area 22, as one file individually. For instance, UDF (Universal Design Format) is used for the file system information.

The RAID data area 22 is an area with respect to which user data is recorded or reproduced. The RAID data area 22 is an area in which data is recorded by constituting a predetermined RAID (e.g. RAID 6 having two parity blocks within a stripe) of the optical disk 1 together with the other optical disks. In other words, whereas the RAID data area 22 is an area in which data is recorded as a RAID, the FS area 20 and the RAID management information area 21 are areas in which data is recorded alone in each of the optical disks 1 without using a RAID system.

The RAID management information area (array management information area) 21 is an area for recording RAID management information (array management information) relating to a RAID used in recording into the RAID data area 22. The RAID management information (array management information) 21 includes RAID configuration information 30, recording failure area management information 31, and magazine management information 32.

Figure 4:
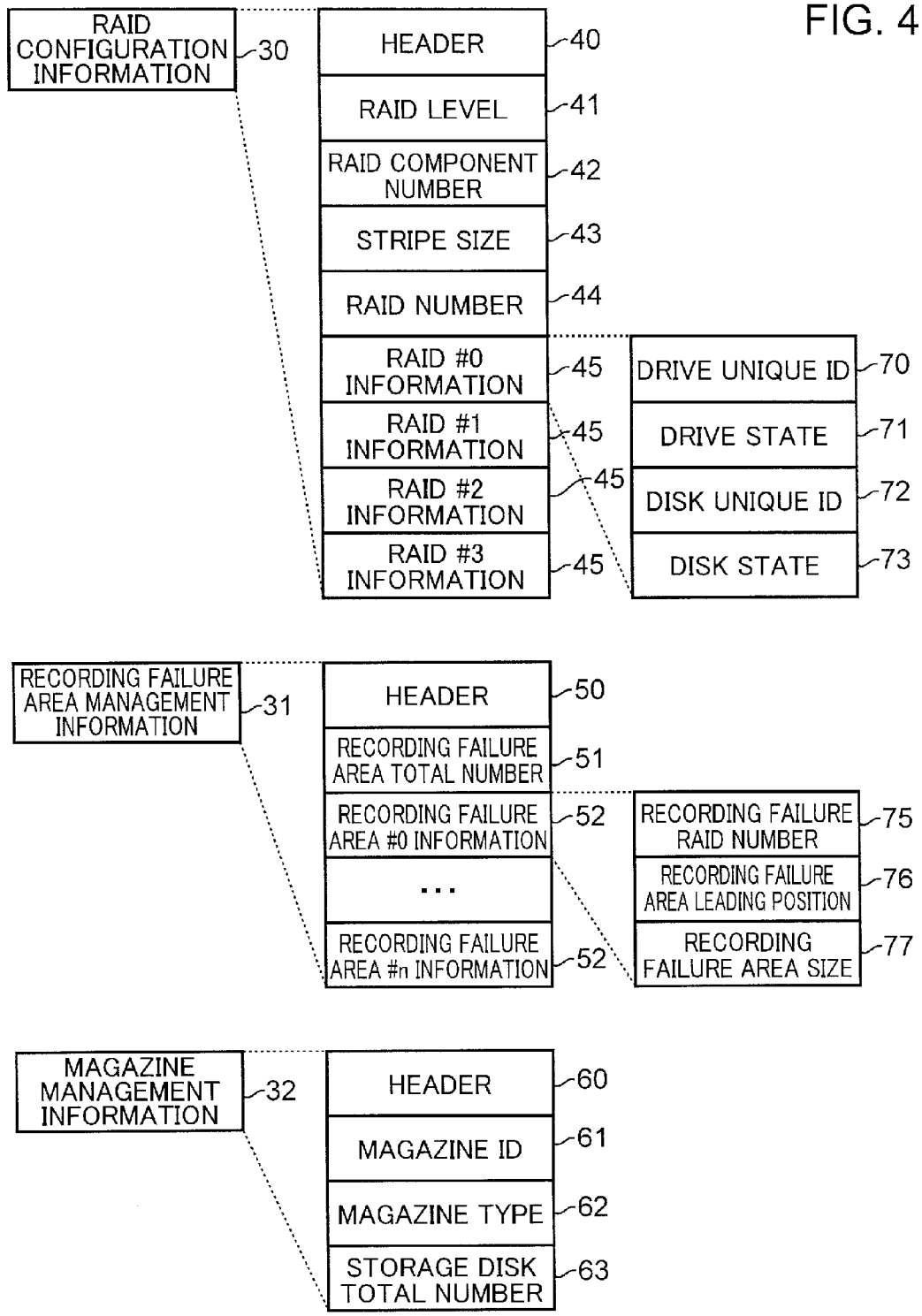
FIG. 4 is a diagram showing a detailed configuration of RAID management information to be recorded in a RAID management information area.

FIG. 4 is a diagram showing a detailed configuration of the RAID management information to be recorded in the RAID management information area 21.

The RAID configuration information 30 includes a header 40, a RAID level 41, a RAID component number 42, a stripe size 43, a RAID number 44, and RAID information 45.

The header 40 is information to be attached to the leading position of the RAID configuration information 30. The header 40 includes information relating to the identifier indicating that the information is the RAID configuration information 30, and to the size of the RAID configuration information 30.

The RAID level (array type information) 41 is information relating to the recording system of a disk array, in other words, relating to the RAID system (level). Specifically, the RAID level (array type) 41 is information for use in allowing the optical disk array system 100 to identify the recording system of a disk array, for instance. In other words, the recording system is information relating to the number of parity data included in a stripe, a parity data generation method, and a user data recovery method using parity data. Specifically, in the embodiment of the invention, the RAID level 41 is information capable of identifying the numerical value corresponding to "RAID 6" or RAID 6.

The RAID component number (array component number information) 42 is information relating to the number of optical disk drives constituting one disk array (RAID) (or the number of optical disks constituting a RAID). Specifically, the RAID component number (array component number information) 42 is information indicating the number of optical disks constituting a disk array. In the embodiment of the invention, the RAID component number 42 is "4". Specifically, the RAID component number (array component number information) 42 is, for instance, information indicating the number of information storage media (optical disks) constituting a disk array.

The stripe size 43 is information relating to the size of a stripe, which is a recording or reproducing unit as a RAID. For instance, assuming that the block size of the respective blocks constituting a stripe in the optical disks is equal to the size (64 KByte) of one cluster, the stripe size 43 is equal to 64 KBytex4=256 KByte, because one stripe is constituted by four optical disks. The stripe size 43 may be equal to the size of data blocks in which only the user data is recorded, without including parity data. In other words, in the case where RAID 6 is constituted of four optical disks, the stripe size 43 may be equal to the size (128 KByte) of data blocks in two optical disks, excluding parity data blocks in the remaining two optical disks.

The RAID number (array number information) 44 is a value indicating at which position, the target optical disk is located among the optical disks constituting a RAID (disk array). In other words, the RAID number 44 is information indicating the ordinal number of the target optical disk in the RAID (disk array). Specifically, as shown in the example of FIG. 1, since the optical disk 1a loaded in the optical disk drive 150a is the optical disk represented by "RAID#0" i.e. the first optical disk constituting a RAID, the RAID number 44 of the optical disk 1a is represented by the suffix "0" following "#", or the numerical value "1" which directly indicates the ordinal number of the optical disk. Further, the RAID number 44 of the optical disk 1b indicated by "RAID#1" is "1" (or "2").

An optical disk is a portable medium. Accordingly, even if the optical disks are loaded in a magazine in the order of disks as a RAID, it is often the case that the order of disks may be changed by repair or maintenance of the optical disk array system 100, or by an operation error of the user. In other words, the optical disk 1d constituting the fourth disk in a RAID may be loaded in the optical disk drive 150a. In such a case, if the optical disk 1d loaded in the optical disk drive 150a is handled as the first disk (RAID#0) in the RAID, the order of reproduction of data is changed, which may cause data corruption at the time of data reproduction. In order to solve this problem, the RAID configuration information 30 is provided with the RAID number 44. In other words, providing the RAID configuration information 30 with the RAID number 44 makes it possible to accurately and continuously record or reproduce data as a RAID, as far as the optical disks constituting a RAID set are loaded, even if the combination of the respective optical disk drives and the respective optical disks constituting the RAID (disk array) is changed.

The RAID information 45 is information relating to each of the optical disk drives and each of the optical disks constituting a RAID, and includes information relating to each optical disk drive and each optical disk having a corresponding RAID number. The RAID configuration information 30 includes pieces of the RAID information 45 by the number equal to the number of optical disk drives (the number of optical disks) constituting a RAID. In the embodiment of the invention, since the four optical disk drives 150*a* to 150*d* constitute a RAID (disk array), the RAID configuration information 30 includes four pieces of RAID information (RAID#0 information 45 to RAID#3 information 45).

In other words, the RAID information 45 is table information (array configuration information table) relating to all the optical disk drives or all the optical disks constituting a RAID (disk array), in which a RAID number (array number) and information (e.g. a device serial number or a medium serial number) capable of identifying an optical disk drive or an optical disk having the RAID number are correlated with each other. The RAID information 45 is an array configuration information table relating to all the information storage media constituting a disk array, in which the array number of the respective optical disks constituting the disk array and the medium identification number for uniquely identifying the respective optical disks are correlated with each other. With use of the RAID information 45, for instance, the optical disk array system 100 is capable of detecting an improper state that an optical disk recorded as a different RAID set is erroneously included.

The management information acquirer 126 acquires the RAID configuration information (array management information) recorded in the RAID management information area. Further, the management information acquirer 126 acquires the RAID configuration information (array management information) recorded in the RAID management information area at least at a timing at which an optical disk drive loaded with an optical disk is started up. The reproduction controller 122 controls the optical disk drives 150*a* to 150*d* based on the acquired RAID configuration information (array management information).

The RAID information 45 includes a drive unique ID 70, a drive state 71, a disk unique ID 72, and a disk state 73.

The drive unique ID 70 is information for identifying an optical disk drive having a corresponding RAID number. The drive unique ID 70 is, for instance, an ID (e.g. a serial number) uniquely attached to each of the optical disk drives, and is, for instance, a serial number of an optical disk drive, with use of which data is recorded on an optical disk for the first time or immediately before recording in this time.

The drive state 71 is information indicating a latest state of an optical disk drive, with use of which data is recorded or reproduced with respect to an optical disk having a corresponding RAID number. In this example, the state of an optical disk drive includes a "normal state" in which a recording operation or a reproducing operation is enabled, a "recording disable state" in which only a recording operation is disabled resulting from an influence such as deterioration or failure of part of the components of an optical disk drive, and a "recording/reproduction disable state (=drive failure state)" in which both of a recording operation and a reproducing operation are disabled, and exchange of an optical disk drive is necessary. The information relating to the drive state 71 is substantially equivalent to the information relating to the optical disk drives to be managed by the drive state manager 127 in the optical disk array system 100.

The disk unique ID 72 is information for identifying an optical disk having a corresponding RAID number. The disk unique ID 72 is an ID uniquely attached to each of the optical disks (e.g. a serial number recorded in a BCA (Burst Cutting Area) provided in BD-R, or a serial number recorded in a RFID of an optical disk attached with a RFID tag). In this example, more specifically, the BCA is an area in which unique information is recorded in the form of a barcode on each of the optical disks with use of a dedicated device at the time of manufacturing the optical disks. The BCA is formed by removing a reflection film by a laser, for instance. In this way, each of the optical disks in this embodiment may have an identification information area (e.g. BCA) in which a medium serial number capable of uniquely identifying an optical disk is recorded in advance.

The disk state 73 is information indicating a latest state of an optical disk having a corresponding RAID number. In this example, the state of an optical disk includes a "normal state" in which a recording operation and a reproducing operation are normally performed, a "degraded state" in which data is missing resulting from recording failure due to some reason, and data recovery is necessary, a "recording disable state" in which a recording operation is disabled because of shortage of a spare area, and a "disk failure (unusable) state" in which a recording operation and a reproducing operation themselves are disabled because management information cannot be read, for instance. The disk state 73 is substantially equivalent to the information relating to the states of the optical disks to be managed by the drive state manager 127 in the optical disk array system 100.

The recording failure area management information 31 includes a header 50, a recording failure area total number 51, and recording failure area information 52.

The header 50 is information to be attached to the leading position of the recording failure area management information 31 substantially in the same manner as the header 40. The header 50 includes information relating to the identifier indicating that the information is the recording failure area management information 31, and to the size of the recording failure area management information 31.

The recording failure area total number 51 is information indicating the total number of areas (=hereinafter, called as recording failure areas), in which data has not been normally recorded due to some reason such as failure of an optical disk drive, and data is missing, out of the optical disks constituting a RAID. Specifically, the recording failure area total number 51 indicates the number of pieces of the recording failure area information 52 to be described later.

The recording failure area information 52 is information relating to a recording failure area. More specifically, the recording failure area information 52 is information capable of specifying an optical disk having a recording failure area constituted of at least one block in which data is missing, and the position of the recording failure area within the optical disk, out of the optical disks constituting a RAID (disk array). The minimum unit of a recording failure area is at least one block in which a recording error has occurred, or at least one block in which data has not been recorded. The recording failure area information 52 includes a recording failure RAID number 75, a recording failure area leading position 76, and a recording failure area size 77.

The recording failure RAID number 75 indicates the ordinal number (RAID number) of a target optical disk having a recording failure area within a RAID, and is information corresponding to the RAID number 44. As far as an optical disk having a recording failure area is identifiable, the recording failure RAID number 75 may be information corresponding to the disk unique ID 72 for identifying the optical disk.

The recording failure area leading position 76 is information relating to a leading position (leading address) within an optical disk having a recording failure area. The recording failure area leading position 76 may be a logical address (LBA) virtually assigned to the user data area 10 (or the RAID data area 22) of an optical disk having a recording failure area. Further, the recording failure area leading position 76 may be a physical address (PBA) such as an ADIP (Address in Pregroove), which is physically attached to an optical disk having a recording failure area.

The recording failure area size 77 is information relating to the size of a recording failure area having the recording failure area leading position 76 as a leading position thereof. The recording failure area size 77 is equal to the size (i.e. the size of a cluster=64 KByte) of the respective blocks constituting a stripe in the optical disks. The recording failure area size 77 may be any size, for instance, the size of a sector i.e. 2 KByte, which is a minimum unit to be used in accessing an optical disk.

In the following, to simplify the description, a state of an optical disk having a recording failure area (an area in which data is missing resulting from recording failure), in which data recovery with use of parity data is necessary in order to satisfy an inherent degree of redundancy, is called as a "degraded state".

The magazine management information 32 is information relating to a magazine (cartridge) for storing a plurality of optical disks constituting a RAID (disk array) as one lot. As described above referring to FIG. 1, the magazine management information 32 is information to be used, in the case where a plurality of optical disks constituting a RAID is stored and managed in one magazine. The magazine management information 32 includes a header 60, a magazine ID 61, a magazine type 62, and a storage disk total number 63.

The header 60 is information to be attached to the leading position of the magazine management information 32 substantially in the same manner as the header 40 and the header 50. The header 60 includes information relating to the identifier indicating that the information is the magazine management information 30, and to the size of the magazine management information 32.

The magazine ID 61 is an ID uniquely attached to each of the magazines (e.g. a barcode attached to a magazine, or information such as a serial number recorded in a RFID). As described above, the magazine ID 61 is recorded in the optical disks. Accordingly, in the case where the user finds it difficult to know the correlation between the respective magazines and the respective optical disks, the user can specify the magazine in which a target optical disk is stored, based on the magazine ID 61.

The magazine type 62 is information indicating the type of a magazine. More specifically, the magazine type 62 is information indicating the type of an optical disk stored in a magazine, the total capacity of an optical disk, or a determination result as to whether the optical disk in the magazine is exchangeable. The information indicating the type of an optical disk is information indicating whether the optical disk is a rewritable optical disk i.e. BD-RE, or a write-once optical disk i.e. BD-R. Further, the total capacity of an optical disk is information indicating whether the optical disk is an optical disk having only one recording layer with a total capacity of 25 GByte, or an optical disk having a dual recording layer with a total capacity of 50 GByte.

The storage disk total number 63 is information indicating the total number of optical disks stored in a magazine.

The RAID management information recorded in the RAID management information area 21 may be the same as each other in all the optical disks constituting a RAID (disk array), except for the RAID numbers 44 included in the RAID configuration information 30. It is impossible to record information in the RAID management information area 21 by a RAID system including parity data. In view of the above, recording the RAID management information which is the same as each other except for the RAID numbers 44 into the optical disks by multiple recording makes it possible to increase the degree of redundancy of RAID management information, and to enhance data reliability.

In this example, description has been made based on the premise that RAID management information is recorded in all the optical disks constituting a RAID (disk array). Alternatively, RAID management information may be recorded in optical disks of a predetermined number or more. More specifically, for instance, in the case where the RAID level of a disk array is RAID 6, it is possible to reproduce data as a disk array, even if two or less optical disk drives or two or less optical disks have a defect, and a data reading operation is disabled. Accordingly, as far as same data is recorded by multiple recording in at least three optical disks, it is possible to acquire the RAID management information without fail. However, it is preferable to configure to read two or more same data, taking into consideration that the reproduced RAID management information is not necessarily the latest RAID management information. In view of the above, it is preferable to record the RAID management information by multiple recording in at least four optical disks out of the optical disks constituting a disk array. In the embodiment of the invention, a disk array is constituted of the four optical disk drives 150a to 150d (four optical disks 1a to 1d). Accordingly, the same RAID management information is recorded by multiple recording substantially in all the optical disks 1a to 1d constituting a disk array.

On the other hand, the RAID number 44 may apparently have an insufficient redundancy, because the RAID number 44 is not recorded multiple times, regardless of a fact that the RAID number 44 is very important information indicating at which position, a target optical disk having recorded information is located among the optical disks constituting a RAID.

Now, let us consider a case, in which acquisition (reproduction) of RAID management information has failed in one of the four optical disks constituting a RAID. In such a case, it is possible to interpolate the RAID number 44 of the optical disk from which acquisition of RAID management information has failed, from the RAID numbers 44 described in the RAID management information of the other three optical disks. Accordingly, even in the case where acquisition (reproduction) of RAID management information of one optical disk has failed, there is substantially no problem regarding redundancy.

However, if acquisition of RAID management information (particularly, RAID number 44) of two or more optical disks out of the four optical disks constituting a RAID has failed, it is impossible to determine the RAID numbers 44 of all the optical disks.

The above problem can be solved by using the RAID information 45 in the RAID configuration information 30. The RAID information 45 includes the disk unique ID 72. In other words, as far as it is possible to acquire the disk unique ID of a target optical disk, it is possible to derive the information as to which position, the target optical disk having the acquired unique ID is located in the RAID. Since data is recorded in the BCA or in the RFID in which the unique ID of the optical disk is recorded by a recording system different from the recording system for an ordinary recording/reproducing area, the BCA or the RFID has very good reproduction characteristics. In other words, even if the RAID management information (particularly, the RAID number 44) of an optical disk cannot be acquired, it is possible to acquire the unique ID of the optical disk from the BCA with a high degree of success. It should be noted that, in the above configuration, the same RAID information 45 is recorded by multiple recording in all the optical disks constituting a RAID (disk array). Accordingly, as far as a certain degree of redundancy is secured in the RAID information 45, the RAID management information recorded in the RAID management information area 21 has a degree of redundancy capable of accurately recognizing the RAID number 44 of each of the optical disks, even if the RAID management information (particularly, the RAID number 44) of two or more optical disks cannot be acquired.

As described above, the RAID number 44 as information to be included in the RAID configuration information 30 is recorded in the RAID management information area 21 of each of the optical disks. Accordingly, it is possible to accurately and continuously record or reproduce data as a RAID, even if the combination of the respective optical disk drives and the respective optical disks constituting the RAID (display array) may be changed by repair or maintenance of the optical disk array system 100, or by an operation error of the user.

Further, the RAID management information area 21 of the respective optical disk is provided with, as the information to be included in the RAID configuration information 30, the RAID information 45 capable of recognizing the respective optical disk having a corresponding RAID number in the RAID, by the number of the optical disk drives constituting the RAID (by the number of the optical disks). Accordingly, it is possible to accurately recognize at which position, a target optical disk is located in the RAID, even in the case where it is impossible to acquire the RAID management information (particularly, the RAID number 44) from the target optical disk constituting the RAID.

Further, the magazine ID 61 is recorded in the RAID management information area 21 of the respective optical disk 1, as information to be included in the magazine management information 32. Accordingly, it is possible to identify the target magazine by reading the magazine ID 61 from the RAID management information area 21 of the respective optical disk, even in the case where it is impossible to accurately store an optical disk in the magazine resulting from anomaly of a changer (not shown) provided in the optical disk array system 100. Thus, it is possible to detect an improper state such that an optical disk constituting another RAID set (magazine) is erroneously loaded.

Further, the drive unique ID 70 is recorded in the RAID management information area 21 of the respective optical disk, as information to be included in the RAID information 45. For instance, let us consider a case, in which the drive unique ID 70 is information capable of identifying an optical disk drive that has been used in a recording operation or in a reproducing operation immediately before the present time. As described above, the optical disk array system 100 is provided with a nonvolatile memory, and adjustment information relating to a magazine such as the optimum recording power is stored in the nonvolatile memory. Applying the adjustment information to a recording operation or a reproducing operation thereafter makes it possible to shorten the startup time.

However, the adjustment information such as the optimum recording power is information that may vary depending on the combination of the respective optical disk drives and the respective optical disks. In other words, in the case where the combination of the respective optical disk drives and the respective optical disks is changed, the current adjustment information cannot be used any longer. In such a case, it is possible to determine whether the optical disk drive currently loaded with an optical disk is the optical disk drive that has calculated the adjustment information stored in the nonvolatile memory by recording the drive unique ID 70 in the optical disk. Thus, it is possible to determine whether it is possible to use the adjustment information stored in the nonvolatile memory.

In the embodiment of the invention, the RAID management information is constituted of three kinds of information i.e. the RAID configuration information 30, the recording failure area management information 31, and the magazine management information 32. The RAID management information may not be necessarily constituted of the three types of information.

For instance, it is needless to say that substantially the same effect as described above can be obtained by integrally constituting the RAID management information of the RAID configuration information 30, the recording failure area management information 31, and the magazine management information 32. The magazine management information 32 is information which is required in the case where a plurality of optical disks constituting a RAID (disk array) are stored in one magazine, and is information which is not necessarily required in the case where a plurality of optical disks constituting a RAID (disk array) are not managed in a magazine.

Although not shown in FIG. 4, for instance, the header 40 of the RAID configuration information 30 may include updated number of times information indicating the number of times of update recording (rewriting), and date information indicating a recording date. The updated number of times information and the date information can be used, for instance, in the case where an anomaly has occurred in the course of updating the RAID management information, or in the case where the user searches for the latest RAID configuration information 30. More specifically, including the updated number of times information in the RAID configuration information 30, for instance, makes it possible to use, as the latest RAID configuration information 30, the RAID configuration information 30 whose number of times of updating is largest among the pieces of the RAID configuration information 30 recorded in the RAID management information areas 21 of the four optical disks 1a to 1d. The effect substantially the same as above can be obtained also in the case where the recording failure area management information 31 or the magazine management information 32 includes the updated number of times information and the date information.

In this embodiment, the recording failure area information 52 included in the recording failure area management information 31 includes the recording failure area leading position 76 indicating the leading position of a recording failure area, and the recording failure area size 77 indicating the size of the recording failure area. As far as the information is capable of recognizing an area in which data is missing resulting from recording failure, the configuration of the recording failure area information 52 is not limited to the above. More specifically, it is needless to say that the effect substantially the same as above can be obtained by a method for managing a recording failure area (block) in the format of a bitmap, in which one bit is assigned to one block (one cluster), on the basis of a block.

In the embodiment of the invention, RAID management information is recorded in a predetermined area on an optical disk constituting a RAID (disk array). It is needless to say that the effect substantially the same as above can be obtained by storing the RAID management information in the nonvolatile memory (memory 140) provided in the optical disk array system 100, or in a RFID provided in a magazine. In the case where the nonvolatile memory provided in the optical disk array system 100 stores the RAID management information, however, the above configuration cannot be used if the optical disk is stored in another optical disk array system. In view of the above, it is preferable to employ the method for recording the RAID management information in optical disks, or in a RFID of a magazine for storing optical disks constituting a RAID.

It should be noted that there is a significant difference between the recording failure area management information 31 described in the embodiment of the invention, and the defect list disclosed in patent literature 2, as will be described in the following.

The defect list is information relating to a defect position of each of the information storage media, which is recorded only in the respective corresponding information storage media. Further, the defect list is information for use in managing a defect cluster on an information storage medium. Accordingly, information relating to recording failure is not recorded, in the case where recording has failed because the recording/reproducing device (drive) for recording data in an information storage medium has failed.

On the other hand, the recording failure area management information 31 is information relating to a block (cluster) in which data is missing, out of the entirety of the RAID (disk array) configured of a group of information storage media, and the same information is recorded in the information storage media constituting the RAID (disk array). Further, even in the case where recording has failed because one of the recording/reproducing devices (drives) for recording data in an information storage medium has failed, the recording failure area management information 31 is recorded in the information storage media constituting the disk array (RAID). Accordingly, the recording failure area management information 31 including the information relating to a block (cluster) in which data is missing because recording has failed resulting from failure of a recording/reproducing device (drive) is recorded in the RAID management information area 21 of the information storage medium loaded in a recording/reproducing device (drive) in a normal state.

In other words, in the method using information called as a defect list, it is impossible to obtain the effect as described in the embodiment of the invention, i.e., the effect of securing high data reliability, high usability, and a high transfer rate with respect to a disk array in a state that a data missing area is included in an optical disk constituting the disk array, and of continuously recording or reproducing data in an optical disk array system using portable information storage media such as optical disks.

(3) Method for Determining Recording Failure Area

In this section, an example of an operation to be performed by the recording state determiner 129 provided in the controller 110 of the optical disk array system 100 is described.

Figure 5:
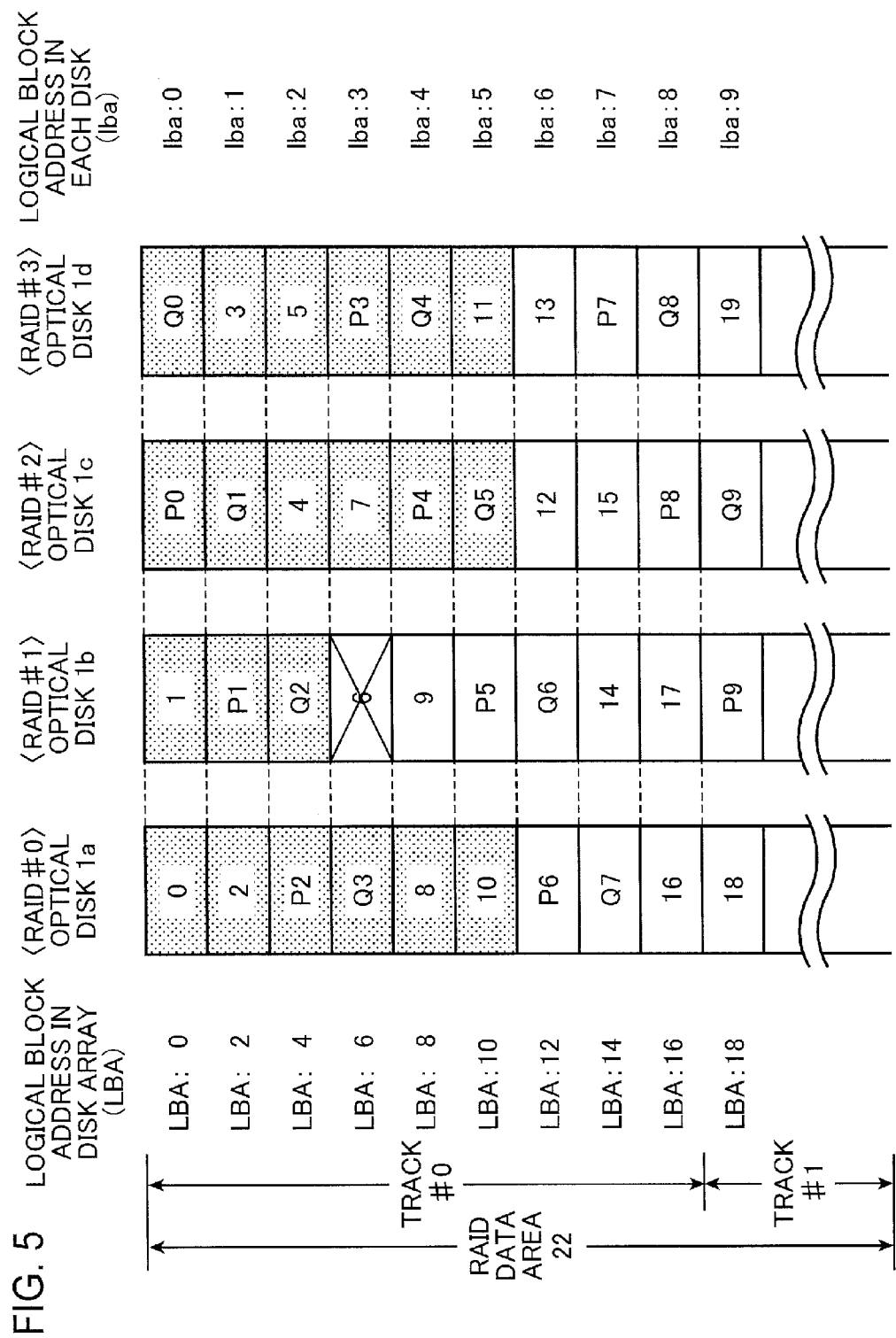
FIG. 5 is an explanatory diagram showing recording states of optical disks in a RAID (disk array) including a recording failure area.

FIG. 5 is an explanatory diagram showing recorded states of the optical disks 1a to 1d in a RAID (disk array) including a recording failure area. More specifically, a disk array of RAID 6 is constituted of the four optical disk drives 150a to 150d, and the four optical disks 1a to 1d shown in FIG. 1. FIG. 5 shows an example, in which the disk array system is brought to a state (recording disable state) incapable of recording data resulting from failure of the optical disk drive 150b during a data recording operation, and a continuous recording operation is disabled with respect to the optical disk 1b constituting RAID#1 loaded in the optical disk drive 150b. The recording failure area shown in FIG. 5 corresponds to the area from the logical block address lba3 to the logical block address lba5 in the optical disk 1b indicated by RAID#1.

Referring to FIG. 5, to simplify the description, a logical block address is assigned to a unit of blocks constituting a stripe. In this example, a logical block address is position information virtually assigned to a space through which a host device (user) is accessible to an optical disk. Further, to simplify the description, "LBA" denotes a logical block address in a logical disk as one optical disk (one volume) constituted of the four optical disks 1a to 1d, and "lba" denotes a logical block address in each of the physical optical disks. In this way, the two logical block addresses are discriminated from each other. The above description on logical block addresses referring to FIG. 5 is also applied to the description of the embodiment hereinafter in the present specification.

FIG. 5 shows a case, wherein the optical disk drive 150b is brought to a recording disable state resulting from recording failure during a recording operation into a block having the logical block address LBA6 of a logical disk, but a recording operation as a disk array is continued and data is recorded until the position corresponding to the logical block address LBA11, because it is possible to perform a recording operation while maintaining the degree of redundancy at the RAID level corresponding to RAID 5 having one parity block. Referring to FIG. 5, the blocks indicated by the hatched portions are recorded blocks, and the blocks indicated by the unhatched portions are unused (unrecorded) blocks.

Let it be assumed that recording has failed in the optical disk 1b because of failure of the optical disk drive 150b or because of failure of the optical disk 1b before a recording operation into a block having the logical block address lba3 or during a recording operation into a block having the logical block address lba3. As a result of the recording failure, the disk array of RAID 6 constituted of the four optical disks 1a to 1d loses a degree of redundancy corresponding to one parity, and turns to a disk array corresponding to RAID 5 having only one parity block. Even in this state, the remaining three optical disk drives 150a, 150c, and 150d are in a normal state, and the degree of redundancy corresponding to RAID 5 is maintained. Accordingly, it is possible to record data while securing reliability.

As described above, the remaining three optical disk drives 150a, 150c, and 150d capable of recording in a normal state can continuously record data. Accordingly, data is recorded until the position corresponding to the logical block address LBA11 as a logical disk. Regarding the optical disk 1b loaded in the optical disk drive 150b which is brought to a recording disable state, the area from the logical block address lba0 to the logical block address lba2 is a normally recorded area, and the area from the logical block address lba3 to the logical block address lba5 is a recording failure area. Further, in the recording failure area, the logical block address lba3 may include an error in a verification operation (verification as to whether data has been normally recorded) during a recording operation or after a recording operation. Accordingly, although the logical block address lba3 is in one of a recorded state, a partially recorded state, and an unrecorded state, the logical block address lba4 and the logical block address lba5 are in an unrecorded state.

Determination as to whether a recording operation is continued in a state that one parity block is lost may be performed by user's designation, for instance.

It is preferable to recover data at an earliest possible timing in the optical disk 1b in a degraded state that data is missing resulting from recording failure. However, in the case where data is archived in portable information media such as optical disks, it is often the case that the optical disks having recorded data are unloaded from the optical disk drives and managed by off-line by shelf management. Further, it is often the case that data cannot be recovered promptly depending on a use condition of the system. In other words, there is a demand for performing a recording operation or a reproducing operation with enhanced reliability, even before data is recovered. In view of the above, it is important to reproduce data with use of a method as exemplified in the section "(4) Method for Reproducing Data from RAID including Recording Failure Area" to be described later for accurately determining a recording failure area.

In the following, as a method for determining a recording failure area by the recording state determiner 129, there are described two practical examples i.e. (i) a method for utilizing the recording failure area management information 31, and (ii) a method for utilizing the track information 80.

(i) Method for Utilizing the Recording Failure Area Management Information 31

Figure 6:
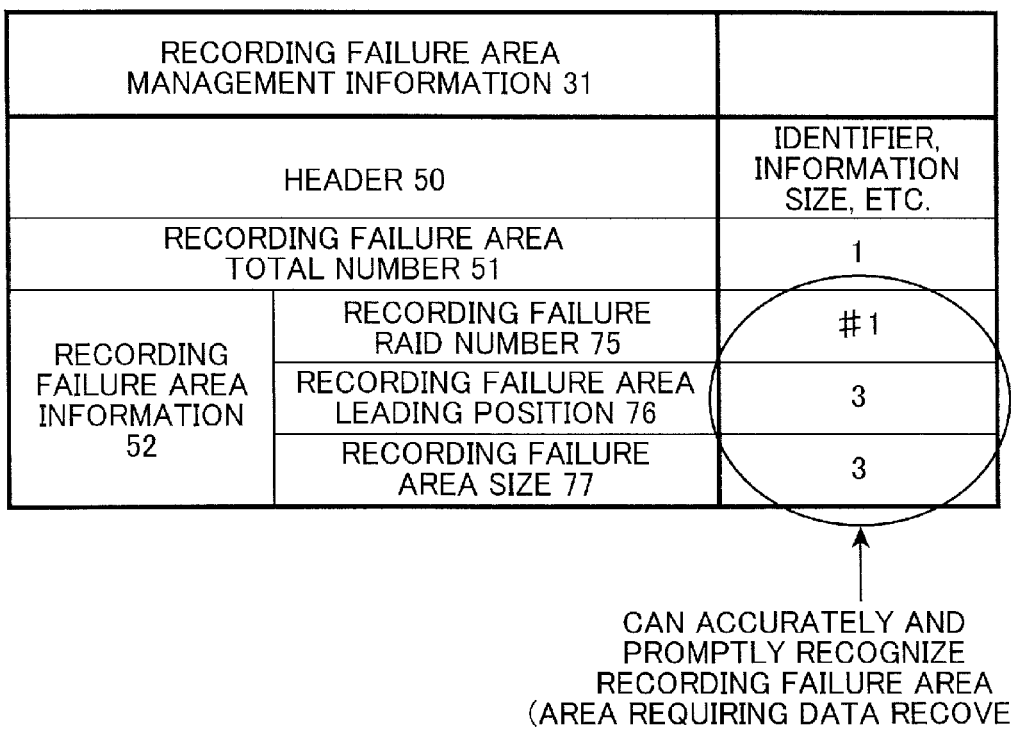
FIG. 6 is a diagram showing a practical example of recording failure area management information to be recorded in the RAID management information area of an optical disk.

FIG. 6 and FIG. 7 are diagrams showing practical examples of RAID management information to be recorded in the RAID management information area 21 of an optical disk.

FIG. 6 is a diagram showing a practical example of the recording failure area management information 31 to be recorded in the RAID management information area 21 of an optical disk. In this example, the RAID (disk array) is in the state shown in FIG. 5. Further, the RAID management information recorded in the RAID management information areas 21 of the optical disks 1a to 1d is read from the memory 140 by the management information acquirer 126 at the time of startup of the optical disks 1a to 1d. Thereafter, the RAID management information stored in the memory 140 is updated to a latest state, each time the contents of the RAID management information is updated. The RAID management information is updated and recorded in the RAID management information areas 21 of the optical disks 1a to 1d by the management information updater 125 at an appropriate timing.

The recording failure area management information 31 is information for use in managing a recording failure area, in which data is not accurately recorded or data is missing resulting from recording failure. The user can recognize at a glance the number of recording failure areas on the RAID (disk array), at which position, the optical disk having the recording failure area is located among the optical disks constituting the RAID, and at which position on the optical disk, the recording failure area is located, from the recording failure area management information 31.

For instance, in the recording failure area management information 31 shown in FIG. 6, the number of recording failure areas on the RAID (disk array) is one, and the recording failure area is present on the optical disk (i.e. on the optical disk 1b) constituting RAID#1. Further, the logical block address at the leading position of the recording failure area is lba3, and the size of the recording failure area is the size equal to the size of three consecutive blocks (in other words, the area from the logical block address lba3 to the logical block address lba5).

It is preferable to recover data at an earliest possible timing in an optical disk in a degraded state in which data is missing resulting from recording failure. In this example, in the case of the optical disk 1b, in which a data recording operation is disabled and a data recording operation has failed resulting from failure of the optical disk drive 150b, exchanging the optical disk drive 150b makes it possible to continuously use the optical disk 1b for a recording operation or for a reproducing operation. In performing the above operation, for instance, the recovery controller 123 recovers the missing data from the parity data on the basis of a stripe, and writes back the recovered data into the recording failure area of the optical disk 1b. Alternatively, the recovery controller 123 may handle the recording failure area as a defect area, and may perform a replacement recording operation of the recovered data into a spare area. By executing one of these methods, it is possible to recover the optical disk 1b into a normal state merely by recovering the data in the recording failure area.

This is one of the primary features of the embodiment, in the case where a RAID is constituted of portable information storage media, unlike a conventional HDD (hard disk drive) system, in which all the data has to be recovered with respect to a new HDD after exchange, in the case where a certain drive has failed and is brought to a degraded state. However, it is necessary to copy the data with respect to another disk set substantially in the same manner as in the conventional HDD in order to recover the data, in the case where a drive has not failed but an optical disk itself constituting a disk array has a problem.

The method (i) is a method applicable not only to a write-once optical disk described in the embodiment of the invention, but also to a rewritable optical disk. However, unlike a write-once optical disk in which additional recording can be performed, a recording operation may be performed at random in a rewritable optical disk. In view of the above, it is preferable to manage a recording failure area in the format of a bitmap, on the basis of a block (on the basis of a cluster).

It is possible to specify the optical disk 1b including a recording failure area, even with use of information other than the recording failure area management information 31. FIG. 7 is a diagram showing the RAID information 45 to be included in the RAID configuration information 30. As shown in FIG. 7, the disk state 73 of the optical disk 1b including a recording failure area and in a degraded state is recorded as a fatal state. Accordingly, it is possible to specify the optical disk 1b including a recording failure area and in a degraded state by verifying the information of the disk state 73. It is needless to say that the control method for recovering and reproducing data from parity data can be implemented without fail by using at least the information of the disk state 73, without using a control method as applied in the conventional HDD, namely, without using the optical disk drive 150b or the optical disk 1b in which failure such as a recording error has occurred for reproduction.

(ii) Method for Utilizing the Track Information 80

Figure 8:
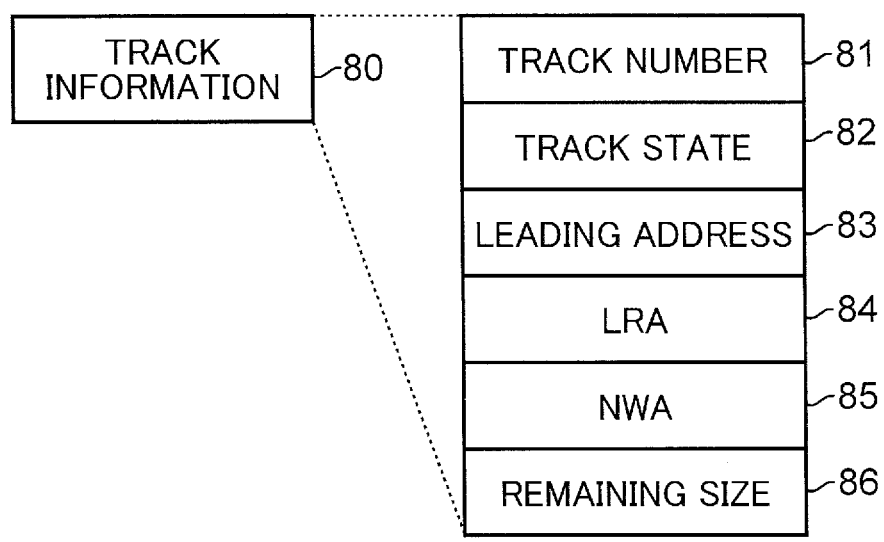
FIG. 8 is an explanatory diagram showing a data structure of track information.

FIG. 8 and FIG. 9 are diagrams for describing track information on an optical disk. In this example, the RAID (disk array) is also in the state shown in FIG. 5.

The optical disk drives 150a to 150d have a function of notifying the controller 110 of the track information 80 relating to the tracks (also called as SRR: Sequential Recording Range) of the loaded optical disks 1a to 1d. In the optical disks, information called as SRRI (SRR Information) is recorded in a management information area called as a DMA (Disk Management Area) or a TDMA (Temporary DMA). SRRI includes information indicating whether the target SRR is recordable (in an open state) with respect to all the tracks (SRR) on the optical disks, and information relating to the leading position and the recording end position of a physical block address, which is a real address on the optical disks. The optical disk drives 150a to 150d notify the track information 80 in the form of a logical block address recognizable by the controller 110 which controls the optical disk drives 150a to 150d, based on SRRI. More specifically, the optical disk drives 150a to 150d return the track information 80 in response to a Read Track Information command defined by the MMC (Multi Media Command) standard.

FIG. 8 is an explanatory diagram showing a data structure of the track information 80.

As shown in FIG. 8, the track information 80 includes a track number 81, a track state 82, a leading address 83, a LRA (Last Recorded Address) 84, a NWA (Next Writable Address) 85, and a remaining size 86.

The track number 81 is information indicating a sequential number assigned to the tracks (SRR) on the optical disks.

The track state 82 is information indicating whether a target track is in a recordable state (in an open state) or in an unrecordable state (in a close state).

The leading address 83 is information relating to the leading position at which the track is disposed, and is notified by a logical block address (lba).

The LRA 84 is information indicating the end position of the track where effective user data is recorded, and is notified by a logical block address (lba).

The NWA 85 is information indicating the position of the track where user data is recordable next, and is notified by a logical block address (lba).

The remaining size 86 is information relating to the size of an area of the track in a recordable state (an unused state).

FIG. 9 is a diagram showing a practical example of the track information 80 in each of the four optical disks 1a to 1d in the state shown in FIG. 5.

As shown in FIG. 9, the track information 80 of the optical disk 1b in which a recording error has occurred has the LRA84 and the NWA85 whose values are different from those of the track information 80 of the other optical disks 1a, 1c, and 1d in a normally recorded state. More specifically, in the case where the track start position (leading address 83) is the same as each other among all the optical disks 1a to 1d, the optical disk whose value of the LRA 84 or the value of the NWA 85 is largest can be determined to be an optical disk in a normally recorded state. Further, the optical disk whose value of the LRA 84 or the value of the NWA 85 is smaller than those of the other optical disks can be determined to be an optical disk having a recording failure area. The same definition is also applied to a case, in which an optical disk has a plurality of tracks.

The value designated by the LRA 84 may be different among the optical disks 1a to 1d constituting a RAID depending on the contents of data (user data, or non-user data such as padding data) to be recorded, even in the case where the data has been normally recorded. In view of the above, determining a recording failure area with use of the NWA 85 is advantageous in determining a recording failure area accurately and easily. In other words, in the table of FIG. 9, the maximum value of the NWA 85 is "6", and the value of the NWA 85 of the optical disk 1b constituting RAID#1 is "3", which is different from the values in the other optical disks. Accordingly, it is possible to determine the area from the logical block address lba3 to the logical block address lba5 (=block preceding the block having the logical bock address lba6 indicated by the NWA 85) in the optical disk 1b, as a recording failure area.

In the case where a method for recording data by offsetting a start position of the RAID data area 22 with respect to each of the optical disks is employed, the position of a track having a block constituting one stripe differs with respect to each of the optical disks, and the leading address 83 of the track also differs with respect to each of the optical disks. However, even in such a case, determining a target track with use of the offset information and the track information 80, and computing a recording failure area based on the value of the LRA or the value of the NWA of the determined track makes it possible to calculate a recording failure area substantially in the same manner as described in the foregoing method.

The method (ii) is applicable only to a write-once optical disk described in the embodiment of the invention, and cannot be applied to a general rewritable optical disk. This is because, a general rewritable optical disk lacks the idea of tracks (SRR). In other words, as far as a rewritable optical disk has substantially the same idea about tracks as in a write-once optical disk, it is possible to apply the method (ii) to the rewritable optical disk.

Figure 10:
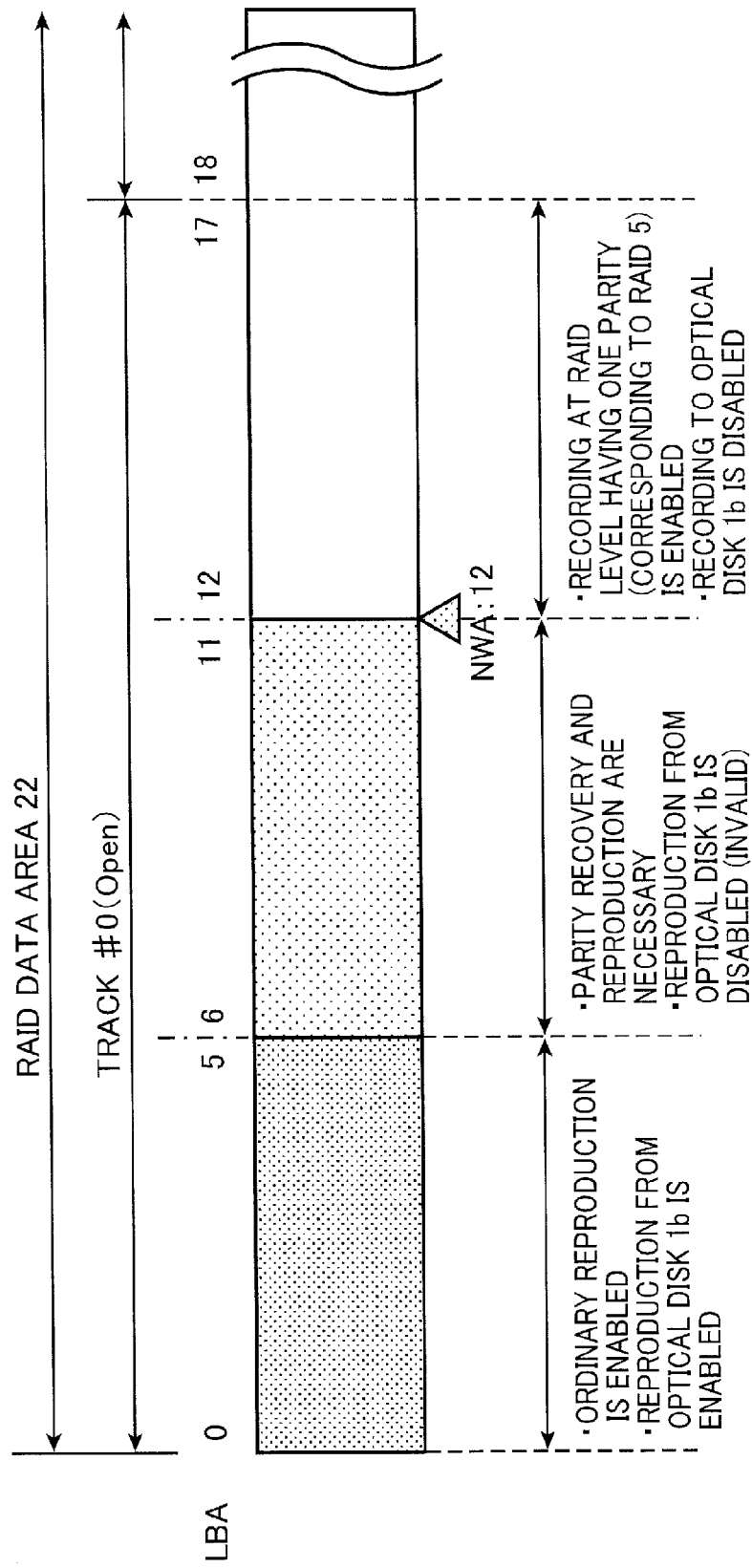
FIG. 10 is an explanatory diagram showing a recording state of a logical disk in a disk array in the state of FIG. 5.

(4) Method for Reproducing Data from Disk Array including Recording Failure Area FIG. 10 is an explanatory diagram showing a recording state of a logical disk in a disk array in the state shown in FIG. 5. It should be noted that the recording state determiner 129 in the RAID controller 120 is already in a state capable of recognizing which area is the recording failure area by the recording failure area determination method described in the section (3).

Conventionally, in the case of HDDs or SSDs frequently used in a disk array device, drives and disks are integrally configured. Accordingly, in the case where an error has occurred resulting from failure of one of the drives and the disks, the HDD in which an error has occurred is brought to an unusable state. Accordingly, in the case where an error has occurred in one HDD in a state that a disk array as RAID 6 is constituted of four HDDs, the disk array is brought to a state, in which the degree of redundancy corresponding to one parity data is lost in all the areas. In other words, all the data recorded in the HDD in which an error has occurred is lost. In the above case, a control method is simple. Basically, data is recovered and reproduced based on parity data in reproducing all the stripes, more specifically, a stripe in which user data has been recorded with respect to the HDD in which an error has occurred.

On the other hand, in the case of a disk array using portable information storage media such as optical disks, as shown in FIG. 10, it is possible to separate drives and disks from each other. Accordingly, even if the optical disk drive 150b has failed and is brought to an unrecordable state, it is possible to continuously use the optical disk 1b by exchanging the optical disk drive 150b, or by utilizing a hot spare drive. Further, in case that a recording error has occurred resulting from local defect such as scratch, smear, or defect of an optical disk, basically, it is possible to use an area other than the area having a recording error. Accordingly, basically, at least the data in a normally recorded area can be used for reproduction, without losing the data.

As shown in FIG. 10, the area from the logical block address LBA0 to the logical block address LBA5 is a normally recorded area while maintaining the degree of redundancy corresponding to RAID 6. Further, the area from the logical block address LBA6 to the logical block address LBA11 is an area, in which a recording operation has been performed with the degree of redundancy corresponding to RAID 5 in which the degree of redundancy corresponding to one parity block is lost. The area after the logical block address LBA12 is an unused (unrecorded) area. At the time of performing a next recording operation, the recording operation is resumed from the logical block address LBA12, which is the next writable address (NWA), in a state that the degree of redundancy corresponding to one parity block is lost substantially in the same manner as described above.

In this example, a reproducing operation is performed in an ordinary manner with respect to the area from the logical block address LBA0 to the logical block address LBA5, in which a recording operation has been normally performed, while maintaining the degree of redundancy corresponding to RAID 6. More specifically, it is possible to accurately reproduce user data by reproducing the user data from an optical disk including a data block, in which at least the user data (non-parity data) has been recorded on the basis of a stripe. Further, in case that a data block could not be normally read, it is possible to recover data in the data block that could not be normally read, with use of a parity block. In other words, even if a disk array includes a recording failure area, it is possible to reproduce data with respect to the area from the logical block address LBA0 to the logical block address LBA5, in which a recording operation has been normally performed, while maintaining enhanced reliability, by the degree of redundancy corresponding to RAID 6. The above control method is a unique control method that could not be implemented in a disk array using HDDs or SSDs, in which drives and disks are integrally configured.

On the other hand, similarly to the case of a conventional HDD, data recovery and reproduction with use of parity data is basically necessary with respect to an area in which a recording operation has been performed in a state that the degree of redundancy corresponding to one parity block is lost, namely, with respect to the area from the logical block address LBA6 to the logical block address LBA11 including a recording failure area. Further, also in the case where data is newly recorded from the next writable address (LBA12), it is possible to continue a data recording operation in a state (corresponding to RAID 5) that the degree of redundancy corresponding to one parity block is lost substantially in the same manner as in a conventional HDD.

The above example is described in more details. In the case of a stripe from the logical block address LBA8 to the logical block address LBA9 shown in FIG. 5, the data in the corresponding blocks in the optical disk 1b into which user data is to be recorded is not accurately recorded, because the blocks are in a recording failure state. Alternatively, the area from the logical block address LBA8 to the logical block address LBA9 in the optical disk 1b may be in an unrecorded state. Accordingly, the recovery controller 123 controls to recover and reproduce at least the user data in the block having the logical block address LBA9, which was to be recorded in the optical disk 1b, with use of parity data recorded in a parity block in reproducing data from the stripe from the logical block address LBA8 to the logical block address LBA9.

More specifically, the reproduction controller 122 controls not to reproduce data from a block within a recording failure area of the optical disk 1b. Alternatively, the reproduction controller 122 may control to reproduce data from a block within a recording failure area of the optical disk 1b, and then to invalidate the reproduced data. In particular, in a disk array system using (write-once) optical disks, it is often the case that an unrecorded area remains in an unrecorded state. An optical disk drive is operated, as if "00" data has been read in response to a reproduction request onto the unrecorded area. In other words, in reproducing data from a stripe having the logical block address LBA8 as a leading position thereof, if data is reproduced from the block having the logical block address LBA9 in the optical disk 1b, and the reproduced data is handled as data in a data block, the data recorded in the block having the logical block address LBA9 may be misjudged as "00" data. As a result, data corruption may occur.

Even if all the stripe data including parity data is read in reproducing data from a stripe, it is possible to detect that the data read from the stripe includes anomaly data. However, in this case, it is impossible to determine which data reproduced from a block within the stripe is anomaly data. In other words, unless reproduction can be controlled by accurately determining a recording failure area, data corruption may occur in a data reproducing operation from a disk array including a recording failure area. However, data corruption can, be prevented, if reproduction can be controlled by accurately determining a recording failure area.

As one of the measures for solving the above problem, it is, of course, needless to say that an optical disk drive may inform an error in response to a reproduction request onto an unrecorded area, without returning "00" data.

On the other hand, in the case of a stripe starting from the logical block address LBA0, user data is also recorded in the optical disk 1b including a recording failure area. However, since the optical disk 1b including a recording failure area is reproducible, data in the optical disk 1a and in the optical disk 1b may be reproduced regarding this stripe. In this case, two parity blocks remain. Accordingly, even if a data reproducing operation from the optical disk 1a and from the optical disk 1b has failed, it is possible to recover and reproduce user data recorded in the stripe, as far as it is possible to reproduce data from the optical disk 1c and from the optical disk 1d, in which parity data P0 and Q0 are recorded.

In this way, it is possible to switch over the reproduction method between a stripe including a recording failure area and a stripe excluding a recording failure area by accurately determining a recording failure area in a disk array including the optical disk 1b, in which a recording error has occurred. By performing the above operation, unlike a disk array system using a conventional HDD, it is possible to perform a reproducing operation, while maintaining enhanced reliability. This is extremely advantageous particularly for business use in which data loss is not allowable, or for use in a data center.

Figure 11:
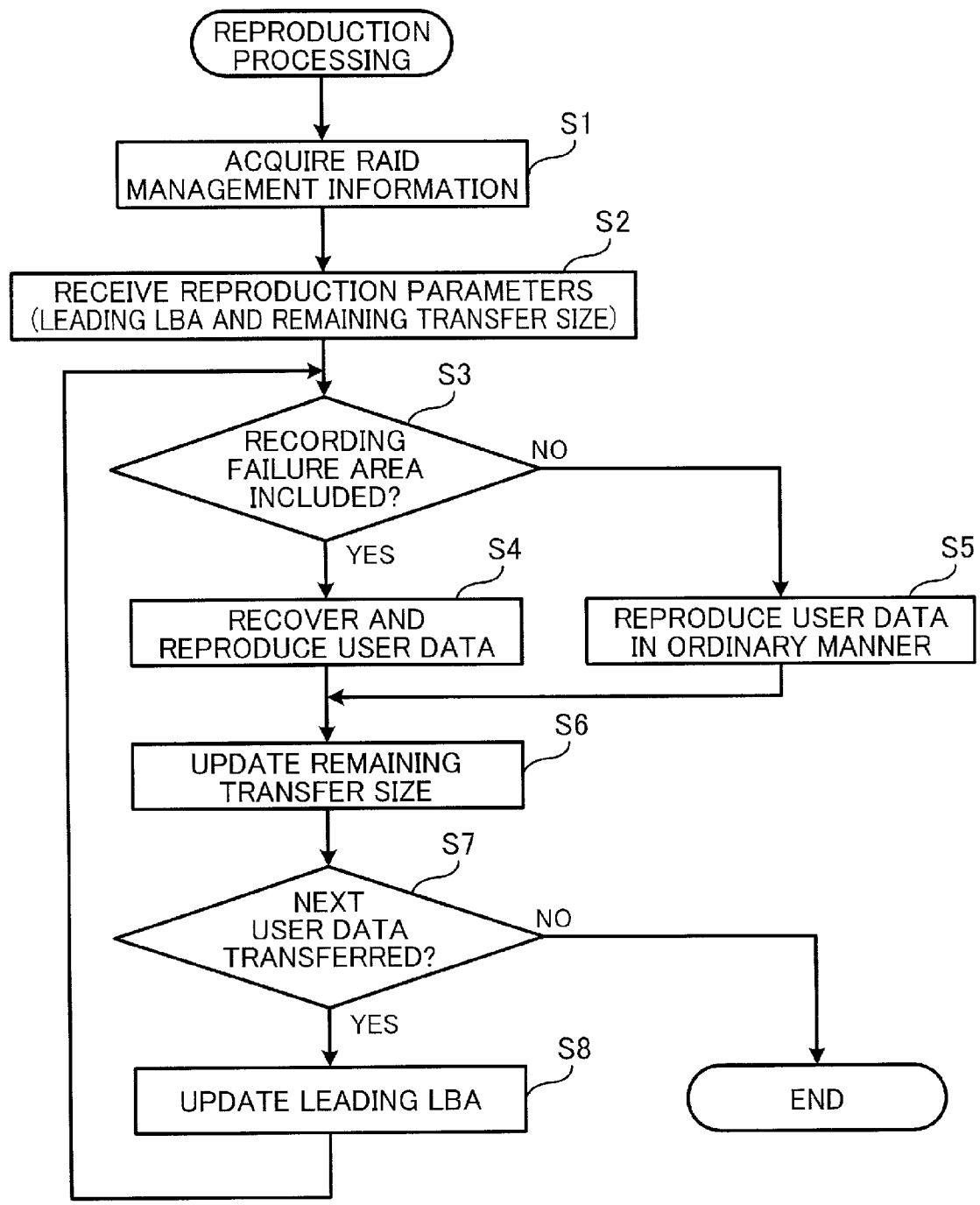
FIG. 11 is a flowchart showing reproduction processing to be performed by the optical disk array system according to the embodiment of the invention.

FIG. 11 is a flowchart showing reproduction processing to be performed by the optical disk array system 100 according to the embodiment of the invention. In this example, there is described a case, in which the optical disk array system 100 receives a reproduction request from the higher-level device (host device) 101. Further, the size of data to be reproduced, which is requested from the higher-level device (host device) 101, is on the basis of a block. In this example, however, to simplify the description, the size of data to be reproduced is on the basis of a stripe. Further, let it be assumed that the RAID (disk array) to be configured in the optical disk array system 100 is in the state shown in FIG. 5.

In Step S1, upon loading of the optical disks 1a to 1d in the optical disk drives 150a to 150d and startup of the optical disk drives 150a to 150d, the management information acquirer 126 acquires RAID management information from the RAID management information areas 21 of the optical disks 1a to 1d loaded in the optical disk drives 150a to 150b. The management information acquirer 126 stores the acquired RAID management information in the memory 140.

Then, in Step S2, the host controller 111 receives information (reproduction parameters) relating to a reproduction position and to a transfer size. More specifically, the host controller 111 in the optical disk array system 100 receives reproduction parameters such as the logical block address (leading LBA) of a logical disk relating to the leading position from which data is reproduced, and the block size (remaining transfer size) by which the data is reproduced and transferred, which have been requested from the higher-level device (host device) 101. The reproduction parameters such as the leading LBA and the remaining transfer size are respectively stored in the memory 140. The leading LBA and the remaining transfer size stored in the memory 140 are updated as necessary in the processing thereafter.

Then, in Step S3, the recording state determiner 129 determines whether a recording failure area is included in a stripe to which the leading LBA belongs. More specifically, the address converter 130 converts a stripe to which the leading LBA 90 which has received a reproduction request belongs, into a logical block address lba in each of the optical disks 1. Then, the recording state determiner 129 determines whether a data block having recorded user data is included in a recording failure area, out of the blocks constituting a stripe to be reproduced. In other words, the recording state determiner 129 determines whether there is an optical disk 1 with respect to which reproduction restriction such as banning of reproduction or invalidation of reproduced data is required.

The recording state determiner 129 determines whether a data block having recorded user data is included in a recording failure area, out of the blocks constituting a stripe to be reproduced, based on the recording failure area determination method described in the section (3).

In this example, in the case where data is reproduced on the basis of a stripe in performing a reproducing operation in a RAID, it is the general practice to read not only user data in a data block but also parity data in a parity block, because a parallel operation as the RAID can be performed. In case that reading of user data from a data block has failed, it is possible to recover and reproduce the user data from parity data in a parity block that has been read simultaneously. In other words, it is inherently necessary to accurately recognize whether not only the user data but also the parity data is accurate. In view of the above, the recording state determiner 129 may determine whether a block is included in a recording failure area, out of the blocks constituting a stripe to be reproduced, regardless of whether the block is a data block or a parity block. However, to simplify the description, in the embodiment of the invention, the recording state determiner 129 determines whether a data block having user data is included in a recording failure area, out of the blocks constituting a stripe to be reproduced.

In the case where the recording state determiner 129 determines that a data block having recorded user data is included in a recording failure area, out of the blocks constituting a stripe to be reproduced, the recording state determiner 129 determines that reproduction restriction is necessary. This processing is substantially the same processing as required in the case where a reproduction error has occurred in a certain optical disk. In the case where it is determined that reproduction restriction is necessary, the control proceeds to the processing of Step S4. In the case where it is determined that reproduction restriction is not necessary, the control proceeds to the processing of Step S5.

In the case where it is determined that a data block having recorded user data is included in a recording failure area, out of the blocks constituting a stripe to be reproduced (YES in Step S3), in Step S4, the reproduction controller 122 recovers and reproduces the user data. More specifically, the reproduction controller 122 requests a target optical disk drive to read user data in a data block while excluding a data block included in a recording failure area, and to read parity data in at least one parity block, out of the blocks constituting a stripe to be reproduced. The read data is temporarily stored in the memory 140, for instance. Then, the reproduction controller 122 recovers the user data that is supposed to be recorded in the data block included in the recording failure area, with use of the parity data. Then, the reproduction controller 122 transfers, to the higher-level device (host device) 101, the user data including the recovered user data, of which reproduction has been requested. By performing the above operation, the reproduction controller 122 can behave with respect to the host device (higher-level device) 101, as if data could have been accurately read from the data block.

In Step S4, the reproduction controller 122 controls not to read data from a block included in a recording failure area. The embodiment is not limited to the above control method. Specifically, for instance, the reproduction controller 122 may cause all the optical disk drives to read the data in all the blocks constituting a stripe, and may invalidate the data in a block or blocks corresponding to a recording failure area, out of the read data, as data that could not be accurately read. Then, the reproduction controller 122 may recover and reproduce the invalid data, with use of parity data. The aforementioned control method may also be implemented. Alternatively, the reproduction controller 122 may control the optical disk drives in such a manner that data reading from an optical disk drive which reproduces an optical disk having a block included in a recording failure area forcibly results in an error. The aforementioned control method may also be implemented.

On the other hand, in the case where it is determined that there is no data block having recorded user data to be included in a recording failure area, out of the blocks constituting a stripe to be reproduced (NO in Step S3), in Step S5, the reproduction controller 122 reproduces the user data in an ordinary manner. More specifically, the reproduction controller 122 requests an optical disk drive to read data in all the blocks constituting a stripe to be reproduced. The read data is temporarily stored in the memory 140. Then, the reproduction controller 122 transfers, to the higher-level device (host device) 101, the user data out of the read data.

In case that there is a data block from which user data could not be accurately read, out of the data blocks having the user data, the reproduction controller 122 recovers and reproduces the user data with use of parity data substantially in the same manner as the processing of Step S4.

Then, in Step S6, the reproduction controller 122 updates the remaining transfer size. More specifically, the reproduction controller 122 updates the value of the remaining transfer size in the memory 140 as a new remaining transfer size by subtracting, from the remaining transfer size stored in the memory 140, a size (corresponding to two blocks) of data of which a transfer operation has been completed in Step S4 or in Step S5.

Then, in Step S7, the reproduction controller 122 determines whether there remains a remaining transfer size. Specifically, the reproduction controller 122 determines whether next user data is to be transferred consecutively. More specifically, the reproduction controller 122 determines whether the remaining transfer size stored in the memory 140 that has been updated in Step S6 is one or more. In the case where it is determined that the remaining transfer size is one or more, in other words, in the case where it is determined that there remains data of which a transfer operation has not been completed (YES in Step S7), the control proceeds to the processing of Step S8. On the other hand, in the case where it is determined that the remaining transfer size is zero, in other words, in the case where it is determined that there is no remaining transfer size, and user data transfer by the size requested from the higher-level device (host device) 101 has been completed (NO in Step S7), the processing is ended.

Then, in Step S8, the reproduction controller 122 updates the leading LBA. Specifically, the reproduction controller 122 updates the value of the leading LBA in the memory 140 as a new leading LBA by adding, to the value of the leading LBA stored in the memory 140, a value of the size (corresponding to two blocks) of data of which a transfer operation has been completed in Step S4 or in Step S5. Then, the control returns to the processing of Step S3.

The aforementioned is the control flow of the reproduction processing.

As described above, data is not reproduced from a block included in a recording failure area, or read data is handled as invalid data in reproducing data from a stripe including a recording failure area. By performing the above operation, it is possible to solve a problem i.e. data corruption at the time of reproduction, even in the optical disk array system 100 provided with an optical disk drive which behaves as if data ("00" data) has been accurately read in response to a reproduction request onto an unrecorded area. Further, in a RAID (disk array) provided with an optical disk having a recording failure area, in the case where data is reproduced with respect to an area, excluding the recording failure area, in which a recording operation could be accurately performed while maintaining the degree of redundancy as the RAID, the data is accurately reproduced while maintaining the degree of redundancy as the RAID. Accordingly, it is possible to enhance data reliability as a RAID (disk array).

The aforementioned Step S1 may be performed at a point of time when an optical disk is loaded (spinup) in an optical disk drive, not at a timing when a reproduction request is received from the higher-level device (host device) 101.

The aforementioned example of FIG. 11 is a case, in which the size of data to be reproduced, which is requested from the higher-level device (host device) 101, is on the basis of a stripe. For instance, in the case where the size of data to be reproduced is on the basis of a block (cluster), data may be reproduced from an optical disk, in which at least data in a target block has been recorded. In case that a target block is included in a recording failure area, in the aforementioned Step S4, for instance, the reproduction controller 122 may recover data from parity data on the basis of a stripe including the target block.

The recording failure area is not necessarily in an unrecorded state. Specifically, in the case of a RAID (disk array) using rewritable optical disks, in some cases, an area may be in an unrecorded state, in which data is missing because data has not been recorded resulting from an influence such as failure of an optical disk drive; but in some cases, the area may be in a state that other data has been recorded. In the latter case, even if an optical disk drive is attempted to be controlled to cause a reproduction error in response to a reproduction request onto an unrecorded area, it is impossible to properly handle the reproduction request. As described in the embodiment of the invention, it is preferable to determine a recording failure area and not to reproduce data from a block included in the recording failure area, or to handle data read from a block included in the recording failure area as invalid data. Applying the above same control method not only to a write-once optical disk but also to a rewritable optical disk makes it possible to provide a data reproduction method with enhanced reliability without data corruption.

Figure 12:
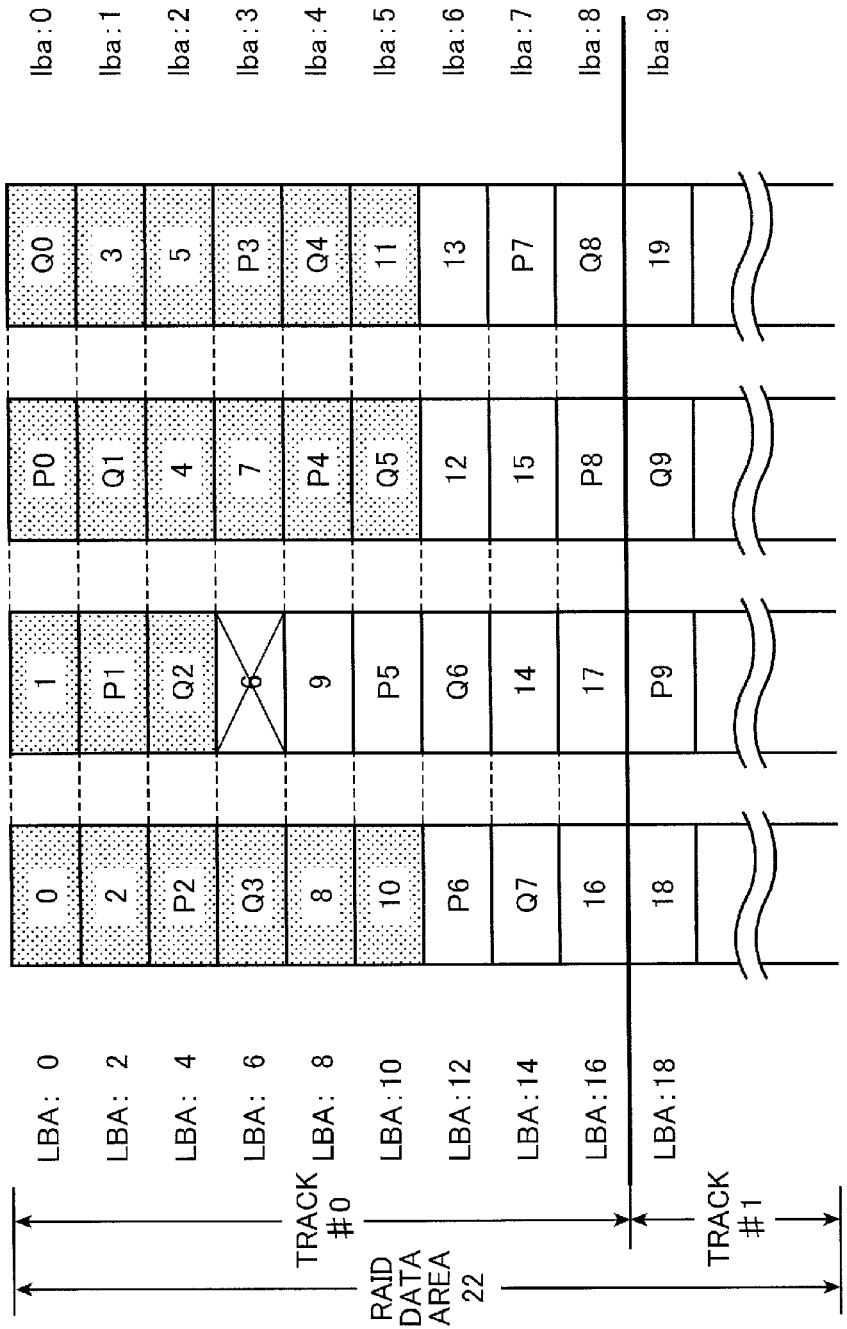
FIG. 12 is a diagram for describing an example, in which an unrecorded area is present in an optical disk constituting a RAID (disk array)

There may be a case, in which there is an unrecorded area within an optical disk constituting a RAID (disk array) at a position other than the area (recording failure area) where recording has failed. Specifically, as shown in FIG. 12, the track (SRR)#0 having recorded user data is brought to an additional writing disable state (close state) in a state that a usable block remains. For instance, in the case of FIG. 12, LRA as a recording end position corresponds to the logical block address LBA11, but the blocks (area) between the logical block address LBA12 and the logical block address LBA17 as the end position of the track #0 remain in an unrecorded state. However, since the above area is not a recording failure area in which recorded data is missing, it is not necessary to handle the above area as a recording failure area, for instance, it is not necessary to record the above area as the recording failure area information 52. In other words, in the case of a disk array using write-once optical disks, an unrecorded area may remain on an optical disk in a normal state (intended state). In other words, a recording failure area is an area in which data is missing simply because of recording failure or a like reason.

Further, generally, effective data is not recorded in the blocks between the logical block address LBA12 and the logical block address LBA17. Accordingly, there is no possibility that a data reproducing operation may be requested with respect to these blocks. However, the optical disk array system 100 may be configured such that data is reproduced as a RAID with use of the function of an optical disk drive which reads "00" data, in the case where a data reproduction request is received from the higher-level device (host device) 101, for instance. In performing the above operation, ordinary reproduction as RAID 6 may be performed for the blocks between the logical block address LBA12 and the logical block address LBA17 substantially in the same manner as for the blocks between the logical block address LBA0 and the logical block address LBA5, because the blocks between the logical block address LBA12 and the logical block address LBA17 are not included in a recording failure area.

Even in the aforementioned case, it is impossible to properly handle a reproduction request onto an unrecorded area merely by controlling an optical disk drive to cause a reproduction error in response to the reproduction request onto the unrecorded area. As described in the embodiment of the invention, it is concluded that an optimum method is determining a recording failure area and preventing data reproduction from a block included in the recording failure area, or handling data read from a block included in a recording failure area as invalid data.

(5) Continuous Recording Method while Securing Degree of Redundancy as RAID Including Recording Failure Area As described above, configuring a disk array of RAID 6 makes it possible to continue a recording operation, as far as the degree of redundancy corresponding to RAID 5 is maintained, even in the case where anomaly (failure) has occurred in one of the optical disk drives (or in one of the optical disks). However, it is desirable to recover the disk array to a state in which the degree of redundancy of original RAID 6 is maintained as soon as possible, and to record data with the degree of redundancy of RAID 6.

In the case of a disk array using a conventional HDD, it is possible to continue a recording operation after data in a failed drive is recovered with use of parity data, by exchanging the failed drive with a normal drive or by using a hot spare drive.

On the other hand, in the case of an array system using optical disks, the optical disks having recorded data are usable, even if an optical disk drive has failed, for instance. In other words, previous data including management information remains in an effective state in the optical disks. In such a case, loading an optical disk in an optical disk drive after exchange or in a hot spare drive makes it possible to continuously use the optical disk as it is, without necessarily requiring data recovery with respect to the optical disk in a degraded state, in which recorded data is missing.

However, particularly, in the case of a write-once optical disk, the recordable position is limited to a next writable address (NWA). Accordingly, it is impossible to continuously record new data as it is, without data recovery with respect to an optical disk in a degraded state.

It is possible to solve the above problem by employing a method for creating a new next writable address (by separating a track). The track separation may be implemented by a Reserve Track command defined by the MMC standard.

Figure 13:
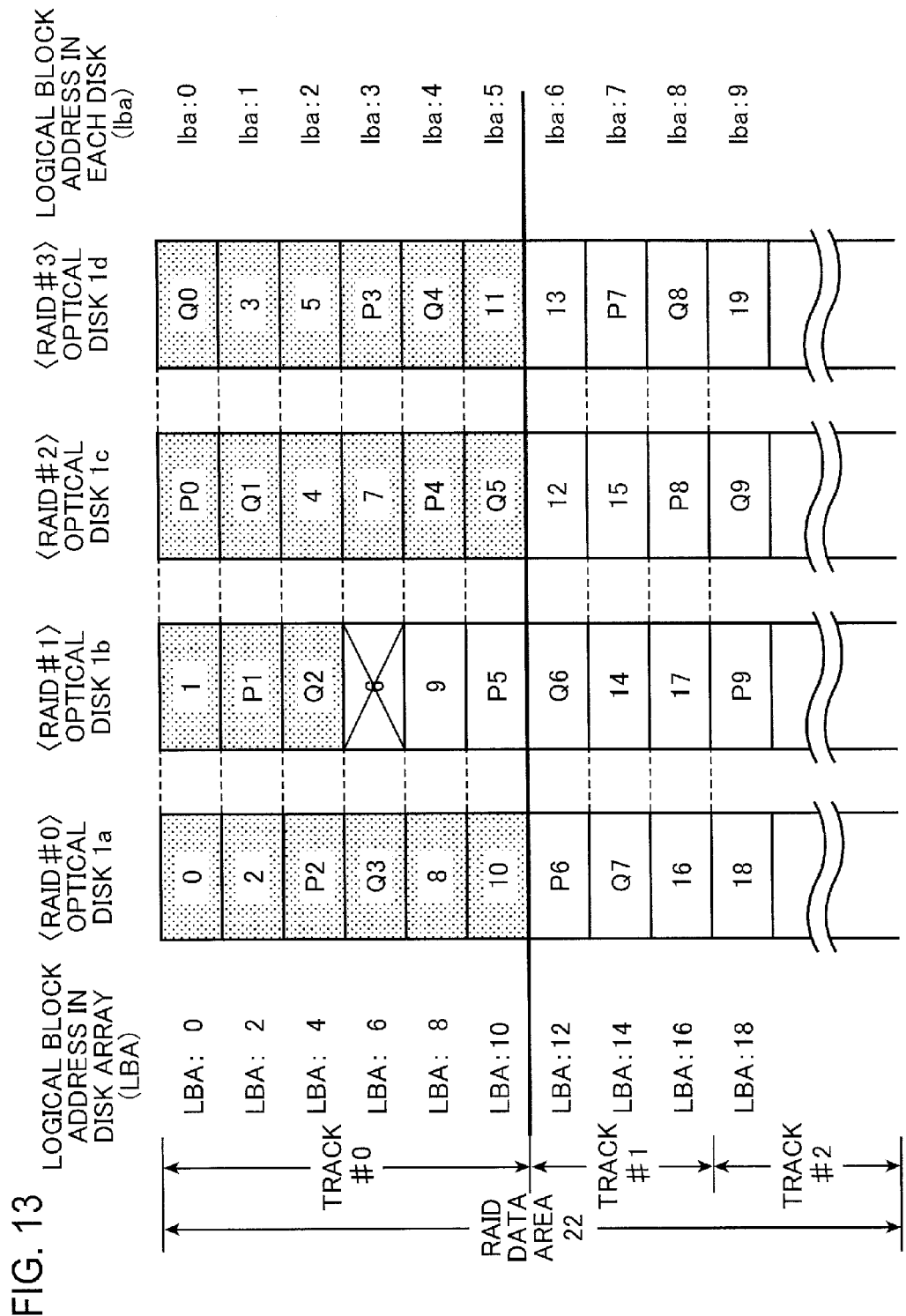
FIG. 13 is an explanatory diagram showing an example of disk states, in the case where data at RAID6 is continuously recorded with respect to a RAID (disk array) including an optical disk having a recording failure area in the state of FIG. 5.

FIG. 13 is an explanatory diagram showing an example of a disk state, in the case where data is continuously recorded at RAID 6 with respect to a RAID (disk array) provided with the optical disk 1b having a recording failure area shown in the state of FIG. 5.

As shown in FIG. 13, let it be assumed that the optical disk 1b constituting RAID#1 includes a recording failure area, and the area from the logical block address LBA6 to the logical block address LBA11 is in a state that data has been continuously recorded with the degree of redundancy corresponding to RAID 5 having only one parity drive. In this state, let us consider a case, in which the failed optical disk drive 150b indicated by RAID#1 is exchanged, and a data recording operation and a data reproducing operation are enabled.

Regarding a RAID (disk array) constituted of the optical disks 1a to 1d in the aforementioned state, a track is separated at a position corresponding to the logical block address LBA12, which is the next writable address (NWA) as a logical disk, and an area from the logical block address LBA12 to a position (i.e. the logical block address LBA17) immediately before the next track start position is defined as a new track (track#1). In other words, a track is separated at a position immediately before the logical block address lba6 as the next writable address NWA in each of the optical disks 1a to 1d with respect to all the optical disks 1a to 1d constituting a RAID. By performing the above operation, it is possible to record data at RAID 6 using all the four optical disks 1a to 1d from the position corresponding to the logical block address LBA, which is the leading position of the logical disk of the newly formed track #1.

More specifically, in a disk array system using a conventional HDD, once a certain HDD is brought to a state including a recording failure area in the course of use, thereafter, a data recording operation is continued only with the degree of redundancy corresponding to RAID 5 having only one parity drive. On the other hand, in the optical disk array system 100 according to the embodiment of the invention, even if one of the optical disks is brought to a state including a recording failure area in the course of use resulting from failure of one of the optical disk drives, for instance, a data recording operation can be continued in a state that a maximum degree of redundancy is maintained by exchanging the optical disk drive or by using another optical disk array system 100 in a normal state. In this way, the optical disk array system 100 according to the embodiment of the invention can implement the effect that could not be obtained by the disk array system using a conventional HDD.

Figure 14:
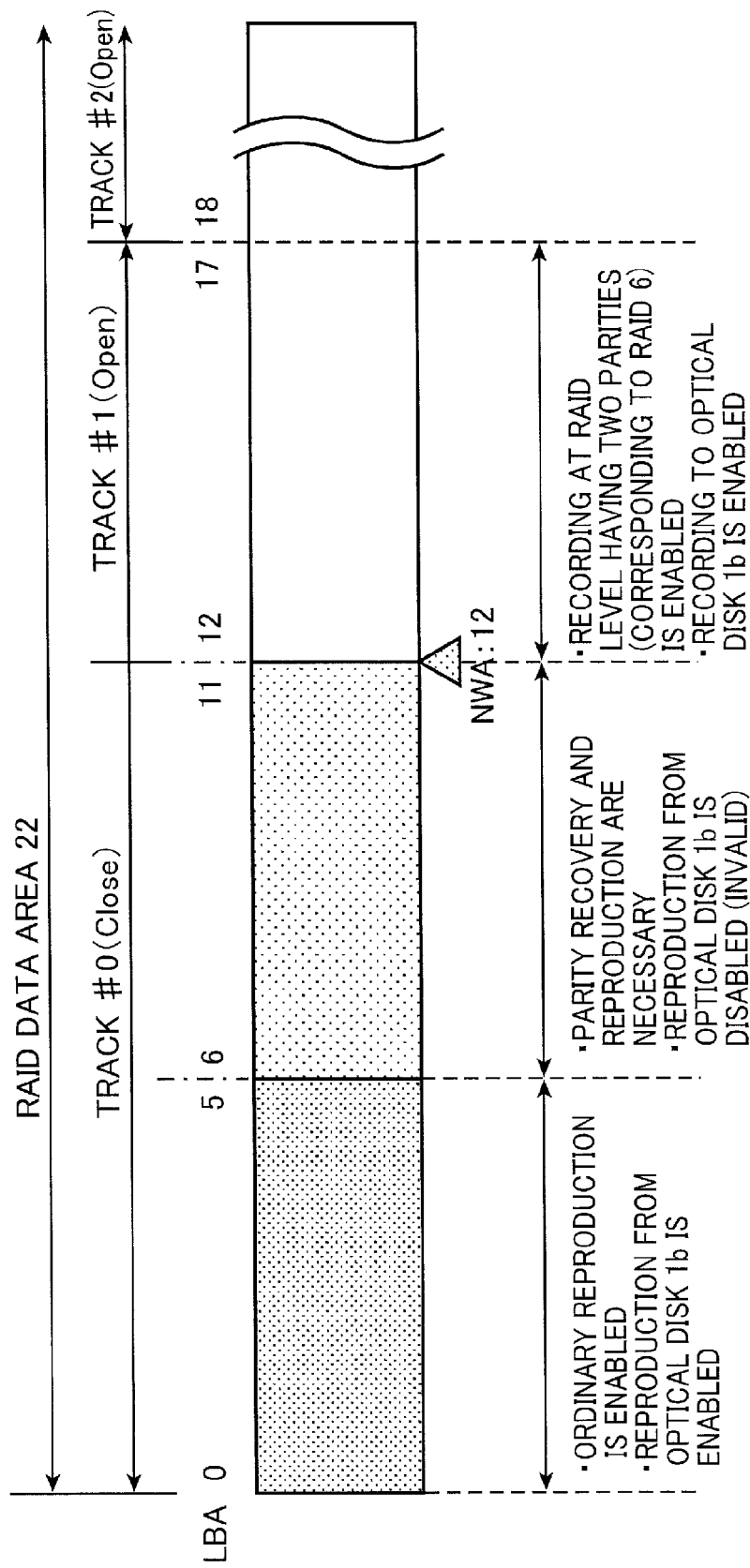
FIG. 14 is a diagram showing a recording state of a logical disk in the disk array shown in FIG. 13.

FIG. 14 is a diagram showing a recording state of a logical disk in the disk array shown in FIG. 13. As compared with the configuration shown in FIG. 10, in the configuration of FIG. 14, a track is separated at the position corresponding to the logical block address LBA12. Accordingly, the reproduction control method with respect to the track #0 from the logical block address LBA0 to the logical block address LBA11 is the same as the reproduction control method described referring to FIG. 10, but the track#0 is logically in a close state in FIG. 14. On the other hand, the configuration of FIG. 14 is substantially the same as the configuration of FIG. 10 in a point that the logical block address LBA12 corresponds to the next writable address (NWA) of the track #1 starting from the logical block address LBA12, but the configuration of FIG. 14 is different from the configuration of FIG. 10 in a point that data is recordable at RAID 6 in the track #1. In other words, regarding a RAID (disk array) provided with the optical disk 1b including a recording failure area, it is possible to record data in a state that a high degree of redundancy corresponding to RAID 6 provided with two parity blocks is maintained in response to a continuous recording request, even before data in the recording failure area is recovered.

Figure 15:
FIG. 15 is a diagram showing a practical example of track information relating to each of the four optical disks in the state of FIG. 13.

FIG. 15 is a diagram showing a practical example of the track information 80 in each of the four optical disks 1a to 1d in the state shown in FIG. 13.

Observing the track information 80 in each of the optical disks 1a to 1d, the track#0 from the logical block address lba0 to the logical block address lba5 is in a close state in the remaining three optical disks 1a, 1c, and 1d except for the optical disk 1c constituting RAID#1. However, since the track is not separated at the NWA (next writable address) in the optical disk 1b, the track #0 from the logical block address lba0 to the logical block address lba5 may remain in an open state. In other words, regarding the tracks constituting one stripe, it is possible to determine that the track of an optical disk whose track state 82 is different (i.e. in an open state), out of the optical disks 1a to 1d constituting a RAID, as a track (i.e., an area requiring data recovery) including a recording failure area. Regarding a newly generated track #1, all the track states 82 of the four optical disks 1a to 1d are the same as each other, and all the NWAs 85 and all the remaining sizes 86 of the four optical disks 1a to 1d are also the same as each other. Accordingly, it is possible to perform a data recording operation at RAID 6 with respect to the entirety of the four optical disks 1a to 1d.

In FIG. 13 and in FIG. 14, a track is separated in all the optical disks 1a to 1d constituting a RAID. Alternatively, substantially the same effect as described above can be obtained by separating a track of an optical disk at least including a recording failure area at the same position as the NWA position of the other optical disks. Use of the above method, however, may change the track separating position between the optical disk at least including a recording failure area, and the other optical disks. This may make it difficult to calculate track information in a logical disk. In view of the above, RAID management information may further include a RAID number 44 of an optical disk in which a track is separated, and position information (i.e. track separating information) indicating the position on the optical disk at which the track is separated.

Further, even in the case where a track is separated in all the optical disks 1a to 1d by the method described referring to FIG. 13 and FIG. 14, it is preferable not to report, to the higher-level device (host device) 101, the information relating to the tracks that have been automatically separated by the optical disk array system 100. In view of the above, even in the case where a track is separated in all the optical disks 1a to 1d constituting a RAID, the RAID management information may further include track separating information indicating the positions of the tracks that have been automatically separated by the optical disk array system 100.

Figure 16:
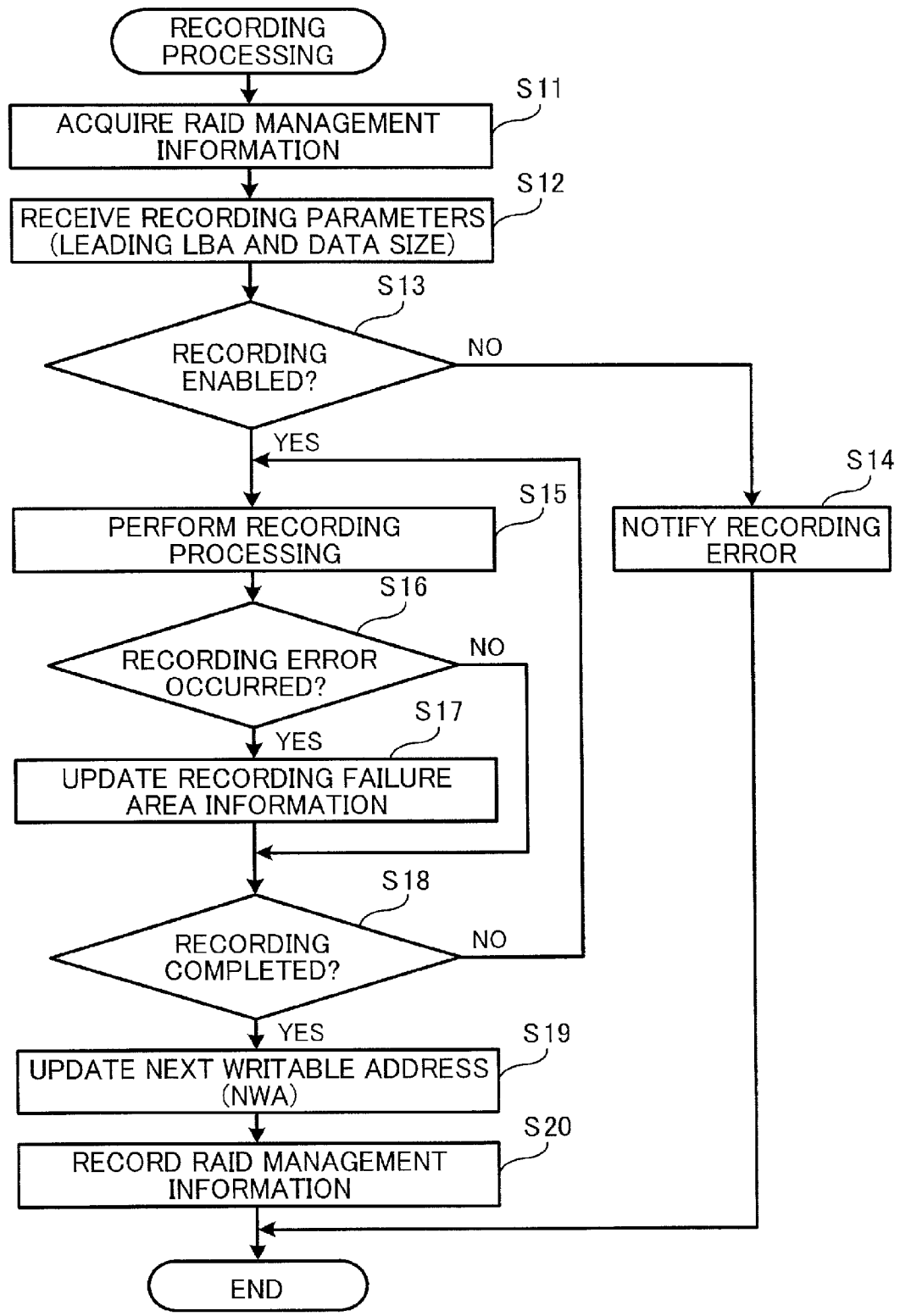
FIG. 16 is a flowchart showing recording processing to be performed by the optical disk array system according to the embodiment of the invention.
Figure 17:
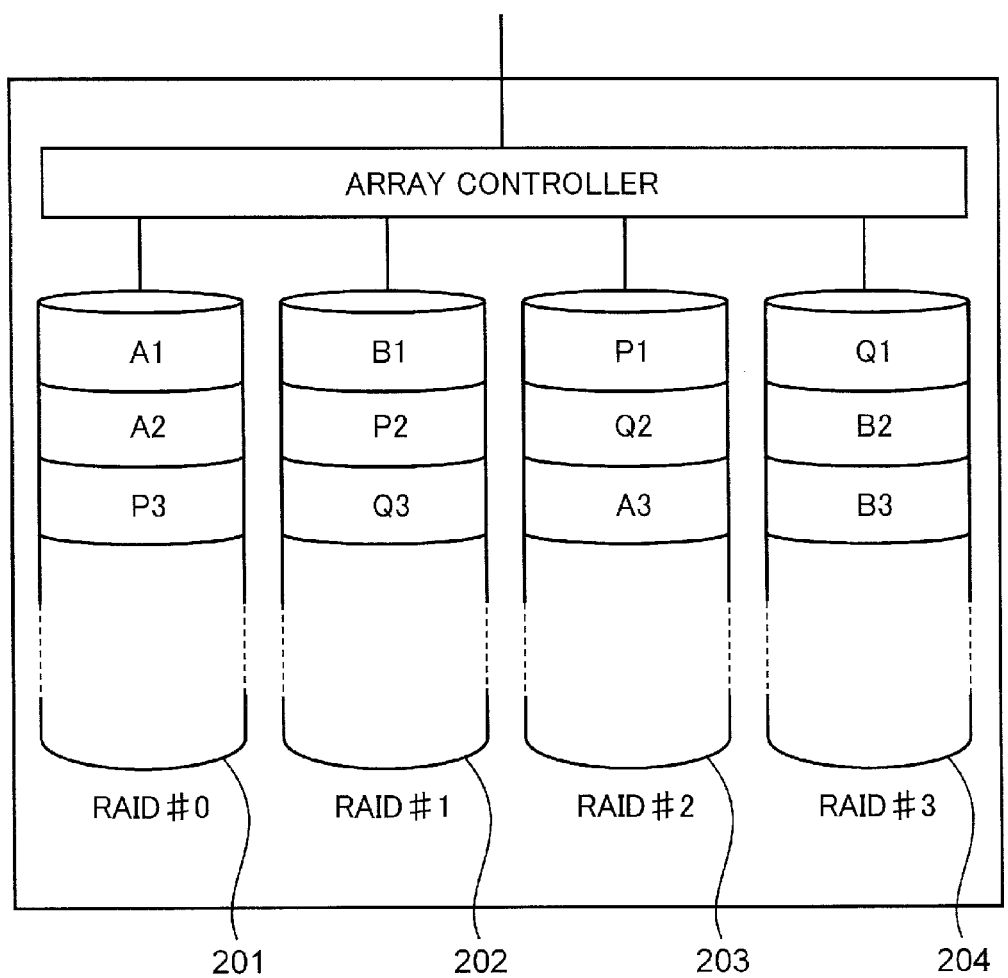
FIG. 17 is a diagram for describing a conventional RAID 6 system.

FIG. 16 is a flowchart showing recording processing to be performed by the optical disk array system 100 according to the embodiment of the invention. In this example, the optical disk array system 100 receives a recording request from the higher-level device (host device) 101. Further, the size of data to be recorded, which is requested from the higher-level device (host device) 101, is on the basis of a block. Further, in the case where cache processing is effective, recording completion may be notified in response to a recording request from the higher-level device (host device) 101, after waiting for completion of receiving recorded data. However, in this embodiment, recording completion is notified in response to a recording request from the higher-level device (host device) 101 after a recording operation has actually been performed with respect to an optical disk.

In Step S11 upon loading of the optical disks 1a to 1d in the optical disk drives 150a to 150d and startup of the optical disk drives 150a to 150d, the management information acquirer 126 acquires RAID management information from the RAID management information areas 21 of the optical disks 1a to 1d loaded in the optical disk drives 150a to 150b. The management information acquirer 126 stores the acquired RAID management information in the memory 140. In the case where an unused optical disk in which RAID management information is not recorded is loaded in an optical disk drive, the management information updater 125 may generate RAID management information, and may record the generated RAID management information in the unused optical disk.

Then, in Step S12, the host controller 111 receives information (recording parameters) relating to a recording position and to a size of data to be recorded. More specifically, the host controller 111 in the optical disk array system 100 receives recording parameters such as a logical block address (leading LBA) of a logical disk relating to a leading position from which data is recorded, and a size of data to be recorded, which have been requested from the higher-level device (host device) 101.

Then, in Step S13, the recording controller 121 determines whether a data recording operation is enabled, based on the recording parameters received by the host controller 111. More specifically, the recording controller 121 determines whether the leading LBA from which a recording operation is started satisfies the requirements on the next writable address (NWA) as a logical disk, or whether the optical disks are in a recordable state as a RAID.

In this example, in a strict sense, it may be possible to determine that the optical disks are in a recordable state as a RAID, regardless of recording failure into a parity drive. For instance, in the case of RAID 6, it may be possible to perform a recording operation corresponding to RAID 0 without a redundant drive, even in a state that recording operations with respect to two optical disk drives (two optical disks) constituting a stripe cannot be simultaneously performed. However, some users may think that all the parity drives should be in a normal state in recording data at RAID 6.

In view of the above, the optical disk array system 100 may be provided with a function of receiving, from a user, setting on a recording continuation error level indicating that a continuous recording operation is not allowed (in other words, notifying a recording error). Specifically, the optical disk array system 100 is configured to receive setting on the number of failed drives (failed disks) allowable by the user. As far as the number of failed drives or failed disks do not exceed the set number, the optical disk array system 100 is handled as a recordable state. In the case where the aforementioned method is employed, for instance, in the case where the recording continuation error level is one (which indicates that one failed drive is allowed) at RAID 6, it is not necessarily required to perform the track separating processing as shown in FIG. 13; and in the case where the recording continuation error level is zero (which indicates that no failed drive is allowed), the track separating processing as shown in FIG. 13 is performed.

In this example, in the case where it is determined that a recording operation is disabled (NO in Step S13), in Step S14, the host controller 111 notifies a recording error in response to a recording request from the higher-level device (host device) 101.

On the other hand, in the case where it is determined that a recording operation is enabled (YES in Step S13), in Step S15, the RAID controller 120 performs data recording processing. More specifically, the recording controller 121 receives recorded data from the higher-level device (host device) 101, and temporarily stores the recorded data in the memory 140 (buffer). Further, the parity calculator 124 generates parity data based on the received recorded data, and temporarily stores the generated parity data in the memory 140. Further, the address converter 130 converts a stripe to which the leading LBA which has received a recording request belongs, into a logical block address in each of the optical disks 1a to 1d. Then, the recording controller 121 outputs, to the respective corresponding optical disk drives 150a to 150d, the received recorded data and the generated parity data that have been stored in the memory 140. The optical disk drives 150a to 150d record the input recorded data or the input parity data into the optical disks 1a to 1d.

Then, in Step S16, the recording controller 121 determines whether a recording error has occurred during a recording operation of the recorded data and the parity data. In this example, in the case where it is determined that a recording error has not occurred (NO in Step S16), the control proceeds to the processing of Step S18.

On the other hand, in the case where it is determined that a recording error has occurred (YES in Step S16), in Step S17, the management information updater 125 updates the recording failure area information included in the RAID management information stored in the memory 140. Specifically, the management information updater 125 updates the recording failure information for specifying a recording failure area, specifically, the recording failure area information 52 including the recording failure RAID number 75, the recording failure area leading position 76, and the recording failure area size 77.

Then, in Step S18, the recording controller 121 determines whether a recording operation of data received from the higher-level device (host device) 101 has been completed. In this example, in the case where it is determined that a data recording operation has not been completed (NO in Step S18), the control returns to the processing of Step S15, and the recording controller 121 continues to record the remaining recorded data and parity data.

In the case where the recording continuation error level is set, and the disk array system satisfies the requirements on the set recording continuation error level, the recording controller 121 determines that the recording request has normally ended, and the control proceeds to the processing of Step S19. On the other hand, in the case where the disk array system does not satisfy the requirements on the set recording continuation error level, the recording controller 121 notifies a recording error in response to the recording request from the higher-level device (host device) 101, assuming that recording has failed.

In the case where it is determined that a data recording operation has been completed (YES in Step S18), in Step S19, the recording controller 121 updates the next writable address (NWA). More specifically, the recording controller 121 updates the information on the next writable address (NWA) as a logical disk, by the size of data of which a recording operation has been completed.

Then, in Step S20, the management information updater 125 records the RAID management information stored in the memory 140 into the optical disks 1a to 1d. At the time of recording, the management information updater 125 records the updated recording failure area information into the optical disks 1a to 1d. The management information updater 125 outputs the RAID management information stored in the memory 140 to the optical disk drives 150*a* to 150*d*. The optical disk drives 150*a* to 150*d* respectively record the input RAID management information in the optical disks 1*a* to 1*d*. Then, the host controller 111 notifies recording completion in response to the recording request from the higher-level device (host device) 101.

The recording processing is implemented by the aforementioned steps.

In this example, it is necessary to prepare recorded data on the basis of a stripe in order to generate parity data by the parity calculator 124 in Step S15. However, it is not always the case that the size of data to be recorded, which has been requested from the higher-level device (host device) 101, may be on the basis of a stripe. In case that data is recorded in a disk array in a state that the size of data to be recorded is smaller than the size of a stripe, the parity calculator 124 may generate parity data by handling the data corresponding to unreceived data in a stripe as fixed data (e.g. null data in which all the bits are zero).

In the above case, a recording operation is actually performed with respect to an optical disk having data to which a recording request is received in the stripe, and with respect to an optical disk having parity data; and a recording operation is not performed with respect to an optical disk having unreceived data. Further, in the case where new recordable data is received with respect to a stripe recorded in the above state, the state of the parity data that has been previously recorded may change. In such a case, the recording controller 121 logically rewrites the parity data, with use of the function called as pseudo overwrite (POW) as described above. By performing the above operation, it is possible to perform a recording operation or a reproducing operation on the basis of data, whose size is smaller than the size of a stripe, even in a disk array using write-once optical disks. In other words, the higher-level device (host device) 101 is capable of issuing a recording request or a reproduction request on the basis of a sector with respect to a disk array constituted of a plurality of write-once optical disks substantially in the same manner as accessing a conventional single optical disk.

The embodiment of the invention has been described with use of RAID 6 as a RAID level. As far as the disk array recording system is such that at least one parity block is included in a stripe, such as RAID 5 having one parity block in a stripe, and that data can be recovered from the parity block, the effects substantially the same as described above can be obtained.

In the embodiment of the invention, the optical disk array system 100 is configured such that a RAID is constituted only of four optical disk drives. However, the number of optical disk drives to be connected is not limited to the above. As far as the number of optical disk drives to be connected is the minimum number or more required as the RAID level in use, the optical disk array system 100 may be constituted of ten or twelve optical disk drives, for instance.

In the embodiment of the invention, the optical disk array system 100 constitutes a RAID (disk array) with use of all the connected four optical disk drives 150*a* to 150*d*. The optical disk array system may not constitute a RAID by using all the connected optical disk drives. Specifically, in the case where six optical disk drives are connected, for instance, RAID 6 may be constituted of five optical disk drives out of the six optical disk drives, and the remaining one optical disk drive may be used as a hot spare drive. The above idea is not only applicable to optical disk drives but also to optical disks. In other words, one of the optical disks may be used as a spare optical disk.

The foregoing embodiment mainly includes the invention having the following configurations.

An information processing device according to an aspect of the invention is an information processing device for recording data in a disk array configured of a plurality of portable information storage media. The information processing device is provided with a plurality of drive devices which respectively record the data in the plurality of the information storage media; and a control section which controls the plurality of the drive devices for recording the data in the disk array by striping the data. Each of the plurality of the information storage media includes a user area having a plurality of data blocks for recording the data on the basis of the data block, and a management information area in which recording failure area information is recorded, the recording failure area information indicating information relating to a recording failure area in which the data is missing. The recording failure area information includes information indicating the information storage medium having the recording failure area, and indicating a position of the recording failure area in the information storage medium, out of the plurality of the information storage media constituting the disk array. The control section includes a data recording section which records the data in the plurality of the data blocks of the plurality of the information storage media by striping the data, and records, in at least one parity block, at least one parity data for use in recovering data in the data block in which the data is missing; out of the plurality of the data blocks, and an area information recording section which records, in a case where recording has failed in at least one of the drive devices at a time of recording the data, the recording failure area information in the management information area of at least one of the information storage media.

According to the above configuration, the plurality of the drive devices respectively record data in the plurality of the information storage media. The control section controls the plurality of the drive devices for recording the data in the disk array by striping the data. Each of the plurality of the information storage media includes a user area having a plurality of data blocks for recording the data on the basis of the data block, and a management information area in which recording failure area information is recorded, the recording failure area information indicating information relating to a recording failure area in which the data is missing. The recording failure area information includes information indicating the information storage medium having the recording failure area, and indicating a position of the recording failure area in the information storage medium, out of the plurality of the information storage media constituting the disk array. The data recording section records the data in the plurality of the data blocks of the plurality of the information storage media by striping the data, and records, in at least one parity block, at least one parity data for use in recovering data in the data block in which the data is missing, out of the plurality of the data blocks. The area information recording section records, in a case where recording has failed in at least one of the drive devices at a time of recording the data, the recording failure area information in the management information area of at least one of the information storage media.

Accordingly, there is recorded recording failure area information including information indicating an information storage medium having a recording failure area in which data is missing, and indicating a position of the recording failure area in the information storage medium, out of a plurality of information storage media constituting a disk array. Thus, the above configuration is advantageous in securing high data reliability, high usability, and a high transfer rate, and in continuously recording data, even before missing data is recovered.

Further, in the information processing device, preferably, each of the plurality of the information storage media may be a write-once information storage medium.

According to the above configuration, each of the information storage media is a write-once information storage medium. Accordingly, it is possible to configure a disk array of the write-once information storage media, in place of rewritable information storage media.

Further, in the information processing device, preferably, the area information recording section may record the recording failure area information in the management information areas of all the plurality of the information storage media at a predetermined timing.

According to the above configuration, it is possible to increase the degree of redundancy of the recording failure area information and to enhance reliability by recording the same recording failure area information in the plurality of the information storage media.

Further, in the information processing device, preferably, the control section may control the plurality of the drive devices for reproducing the data from the disk array, the plurality of the drive devices may reproduce the data from each of the plurality of the information storage media, and the control section may further include a reproduction control section which invalidates data read from the recording failure area, based on the recording failure area information, and reproduces data in the recording failure area with use of the at least one parity data.

According to the above configuration, the control section controls the plurality of the drive devices for reproducing the data from the disk array. The plurality of the drive devices reproduce the data from each of the plurality of the information storage media. The reproduction control section invalidates data read from the recording failure area, based on the recording failure area information, and reproduces data in the recording failure area with use of the at least one parity data.

Accordingly, the data read from the recording failure area is invalidated, based on the recording failure area information, and the data in the recording failure area is reproduced with use of the at least one parity data. This is advantageous in securing high data reliability, high usability, and a high transfer rate, and in continuously reproducing data, without the need of recovering missing data, even if data in a predetermined area of one of the information storage media is missing resulting from failure of a drive device or an information storage medium.

Specifically, even in an information processing device provided with a drive device which behaves as if data has been accurately read in response to a reproduction request onto an unrecorded area, it is possible to invalidate the data read from a recording failure area. This is advantageous in solving a problem e.g. data corruption at the time of reproduction.

Further, in the case where data is reproduced from an area, excluding a recording failure area, in which a recording operation has been performed while maintaining a certain degree of redundancy, in a disk array provided with information storage media having a recording failure area, the data is reproduced while maintaining a certain degree of redundancy. This is advantageous in enhancing data reliability as a disk array.

Further, in the information processing device, preferably, array management information for managing a recording state relating to the disk array may be further recorded in the management information area. The array management information may include array type information for identifying a recording system of the disk array, array component number information indicating a number of the information storage media constituting the disk array, array number information indicating an ordinal number of the respective information storage media in the disk array, and an array configuration information table relating to all the information storage media constituting the disk array, in which the array number of the respective information storage media constituting the disk array, and a medium identification number for uniquely identifying the respective information storage media are correlated with each other. The area information recording section may record the array management information in the management information area at a timing when an initialization processing for configuring the disk array is performed.

According to the above configuration, array management information for managing a recording state relating to the disk array is further recorded in the management information area. The array management information includes array type information for identifying a recording system of the disk array, array component number information indicating a number of the information storage media constituting the disk array, array number information indicating an ordinal number of the respective information storage media in the disk array, and an array configuration information table relating to all the information storage media constituting the disk array, in which the array number of the respective information storage media constituting the disk array, and a medium identification number for uniquely identifying the respective information storage media are correlated with each other. The area information recording section records the array management information in the management information area at a timing when an initialization processing for configuring the disk array is performed.

Accordingly, for instance, even in the case where the order of the respective information storage media constituting the disk array is changed, and the correlation between the respective drive devices and the respective information storage media is changed, it is possible to accurately recognize the correlation between the respective drive devices and the respective information storage media, based on the array number information, and to continuously record the data. Further, in case that it is impossible to acquire array number information from the respective information storage media, it is possible to accurately know the order of the respective information storage media within the disk array, based on the array configuration information table.

Further, in the information processing device, preferably, the array type information may be information capable of identifying a number of the parity data, a method for generating the parity data, and a method for recovering data in the recording failure area with use of the parity data.

According to the above configuration, it is possible to identify the number of the parity data, the method for generating the parity data, and the method for recovering data in the recording failure area with use of the parity data.

Further, in the information processing device, preferably, array management information for managing a recording state of the disk array may be further recorded in the management information area. The array management information may include array type information for identifying a recording system of the disk array, array component number information indicating a number of the information storage media constituting the disk array, array number information indicating an ordinal number of the respective information storage media in the disk array, and an array configuration information table relating to all the information storage media constituting the disk array, in which the array number of the respective information storage media constituting the disk array, and a medium identification number for uniquely identifying the respective information storage media are correlated with each other. The control section may further include an information acquiring section which acquires the array management information recorded in the management information area at least at a timing when the drive device loaded with the information storage medium is started up. The reproduction control section may control the plurality of the drive devices, based on the acquired array management information.

According to the above configuration, array management information for managing a recording state relating to the disk array is further recorded in the management information area. The array management information includes array type information for identifying a recording system of the disk array, array component number information indicating a number of the information storage media constituting the disk array, array number information indicating an ordinal number of the respective information storage media in the disk array, and an array configuration information table relating to all the information storage media constituting the disk array, in which the array number of the respective information storage media constituting the disk array, and a medium identification number for uniquely identifying the respective information storage media are correlated with each other. The information acquiring section acquires the array management information recorded in the management information area at least at a timing when the drive device loaded with the information storage medium is started up. The reproduction control section controls the plurality of the drive devices, based on the acquired array management information.

Accordingly, for instance, even in the case where the order of the respective information storage media constituting the disk array is changed, and the correlation between the respective drive devices and the respective information storage media is changed, it is possible to accurately recognize the correlation between the respective drive devices and the respective information storage media, based on the array number information, and to continuously reproduce the data. Further, in case that it is impossible to acquire array number information from the respective information storage media, it is possible to accurately know the order of the respective information storage media within the disk array, based on the array configuration information table.

Further, in the information processing device, preferably, the control section may further include an information acquiring section which acquires the recording failure area information from the management information area.

According to the above configuration, the information acquiring section acquires the recording failure area information from the management information area. Accordingly, at the time of data recording, recording failure area information acquired from the management information area is temporarily stored in a memory, and in the case where recording has failed in at least one of the drive devices, the recording failure area information in the memory is updated. By performing the above operation, it is not necessary to record recording failure area information in an information storage medium, each time recording has failed. This is advantageous in reducing the number of times of accessing the information storage medium.

Further, in the information processing device, preferably, the recording failure area may include at least one of a data block in which a recording error has occurred, and a data block in which the data has not been recorded.

According to the above configuration, it is possible to record, in an information recording medium, information relating to at least one of a data block in which a recording error has occurred, and a data block in which the data has not been recorded.

An information processing method according to another aspect of the invention is an information processing method for recording data in a disk array constituted of a plurality of portable information storage media. Each of the plurality of the information storage media includes a user area having a plurality of data blocks for recording the data on the basis of the data block, and a management information area in which recording failure area information is recorded, the recording failure area information indicating information relating to a recording failure area in which the data is missing. The recording failure area information includes information indicating the information storage medium having the recording failure area, and indicating a position of the recording failure area in the information storage medium, out of the plurality of the information storage media constituting the disk array. The method is provided with a data recording step of controlling a plurality of drive devices to record the data in each of the plurality of the information storage media in such a manner as to record the data in the plurality of the data blocks of the plurality of the information storage media by striping the data, and in such a manner as to record, in at least one parity block, at least one parity data for use in recovering data in the data block in which the data is, missing, out of the plurality of the data blocks, and a recording failure area information recording step of recording, in a case where recording has failed in at least one of the drive devices at a time of recording the data, the recording failure area information in the management information area of at least one of the information storage media.

According to the above configuration, each of the plurality of the information storage media includes a user area having a plurality of data blocks for recording the data on the basis of the data block, and a management information area in which recording failure area information is recorded, the recording failure area information indicating information relating to a recording failure area in which the data is missing. The recording failure area information includes information indicating the information storage medium having the recording failure area, and indicating a position of the recording failure area in the information storage medium, out of the plurality of the information storage media constituting the disk array. In the data recording step, a plurality of drive devices are controlled to record the data in each of the plurality of the information storage media in such a manner as to record the data in the plurality of the data blocks of the plurality of the information storage media by striping the data, and in such a manner as to record, in at least one parity block, at least one parity data for use in recovering data in the data block in which the data is missing, out of the plurality of the data blocks. In the recording failure area information recording step, in a case where recording has failed in at least one of the drive devices at a time of recording the data, the recording failure area information is recorded in the management information area of at least one of the information storage media.

Accordingly, there is recorded recording failure area information including information indicating an information storage medium having a recording failure area in which data is missing, and indicating a position of the recording failure area in the information storage medium, out of a plurality of information storage media constituting a disk array. Thus, the above configuration is advantageous in securing high data reliability, high usability, and a high transfer rate, and in continuously recording data, even before missing data is recovered.

An information storage medium according to yet another aspect of the invention is a portable information storage medium for recording data. The information storage medium is provided with a user area including a plurality of data blocks for recording the data on the basis of the data block, and a management information area in which recording failure area information is recorded, the recording failure area information indicating information relating to a recording failure area in which the data is missing. A plurality of the portable information storage media constitute a disk array. The data obtained by striping and being stored in the plurality of the information storage media, and parity data for use in recovering data in the data block in which the data is missing, out of the plurality of the data blocks, are recorded in the user area. The recording failure area information includes information indicating the information storage medium having the recording failure area, and indicating a position of the recording failure area in the information storage medium, out of the plurality of the information storage media constituting the disk array.

According to the above configuration, the user area includes a plurality of data blocks for recording data on the basis of the data block. In the management information area, there is recorded recording failure area information indicating information relating to a recording failure area in which the data is missing. A plurality of the portable information storage media constitute a disk array. In the user area, there are recorded the data obtained by striping and being stored in the plurality of the information storage media, and parity data for use in recovering data in the data block in which the data is missing, out of the plurality of the data blocks. The recording failure area information includes information indicating the information storage medium having the recording failure area, and indicating a position of the recording failure area in the information storage medium, out of the plurality of the information storage media constituting the disk array.

Accordingly, there is recorded recording failure area information including information indicating an information storage medium having a recording failure area in which data is missing, and indicating a position of the recording failure area in the information storage medium, out of a plurality of information storage media constituting a disk array. Thus, the above configuration is advantageous in securing high data reliability, high usability, and a high transfer rate, and in continuously recording data, even before missing data is recovered.

The specific embodiment of the invention has been described as above. It is, however, obvious that other many modifications, variations, and other use may be included in the invention to a person skilled in the art. Therefore, the invention is not limited to the specific embodiment herein, but may be defined only by the following claims.

In other words, the embodiment or the examples described in the detailed description of embodiments is provided to clarify the technical contents of the invention. The invention should not be construed to be limited to the embodiment or the examples. The invention may be modified in various ways as far as such modifications do not depart from the spirit and the scope of the invention hereinafter defined.

INDUSTRIAL APPLICABILITY

The information processing device, the information processing method, and the information storage medium of the invention are capable of securing high data reliability, high usability, and a high transfer rate, and capable of continuously recording data, even before missing data is recovered; and are useful as an information processing device, an information processing method, and an information storage medium for recording data in a disk array constituted of a plurality of portable information storage media. Further, the information processing device, the information processing method, and the information storage medium of the invention are applicable to an archive device in a computer system, for instance.

The invention claimed is:

1. An information processing device for recording data in a disk array including a plurality of portable information storage media, the information processing device comprising:
   a plurality of drive devices which respectively record the data in the plurality of the information storage media; and
   a control section which controls the plurality of the drive devices for recording the data in the disk array by striping the data,
   each of the plurality of the information storage media including:
      a user area having a plurality of data blocks for recording the data, and
      a management information area in which recording failure area information is recorded, the recording failure area information including: information indicating which information storage medium, among the plurality of the information storage media of the disk array, has a recording failure area in which the data is missing; and information indicating a position of the recording failure area in the information storage medium that has the recording failure area,
   the control section including:
      a data recording section which records the data in the plurality of the data blocks of the plurality of the information storage media by striping the data, and records, in at least one parity block, at least one parity data for use in recovering data in the data block, among the plurality of data blocks, in which the data is missing, and
      an area information recording section which records, in a case where recording has failed in at least one of the drive devices at a time of recording the data, the recording failure area information in the management information area of at least one of the information storage media, wherein
   the management information area further includes array management information for managing a recording state relating to the disk array,
   the array management information includes:
      array type information for identifying a recording system of the disk array,
      array component number information indicating how many of the information storage media are included in the disk array,
      array number information indicating an ordinal number of the respective information storage media in the disk array, and
      an array configuration information table relating to all the information storage media of the disk array, in which the array number of the respective information storage media included in the disk array, and a medium identification number for uniquely identifying the respective information storage media are correlated with each other, and the area information recording section records the array management information in the management information area at a timing when an initialization processing for configuring the disk array is performed.

2. The information processing device according to claim 1, wherein
each of the plurality of the information storage media is a write-once information storage medium.

3. The information processing device according to claim 1, wherein
the area information recording section records the recording failure area information in the management information areas of all the plurality of the information storage media at a predetermined timing.

4. The information processing device according to claim 1, wherein
the control section controls the plurality of the drive devices for reproducing the data from the disk array,
the plurality of the drive devices reproduce the data from each of the plurality of the information storage media, and
the control section further includes a reproduction control section which invalidates data read from the recording failure area, based on the recording failure area information, and reproduces data in the recording failure area with use of the at least one parity data.

5. The information processing device according to claim 1, wherein
the array type information is information capable of identifying a number of the parity data, a method for generating the parity data, and a method for recovering data in the recording failure area with use of the parity data.

6. An information processing device for recording data in a disk array including a plurality of portable information storage media, the information processing device comprising:
a plurality of drive devices which respectively record the data in the plurality of the information storage media, and reproduce the data from each of the plurality of the information storage media; and
a control section which controls the plurality of the drive devices for recording the data in the disk array by striping the data, and controls the plurality of the drive devices for reproducing the data from the disk array,
each of the plurality of the information storage media including:
a user area having a plurality of data blocks for recording the data, and
a management information area in which recording failure area information is recorded, the recording failure area information including: information indicating which information storage medium, among the plurality of the information storage media of the disk array, has a recording failure area in which the data is missing; and information indicating a position of the recording failure area in the information storage medium that has the recording failure area,
the control section including:
a data recording section which records the data in the plurality of the data blocks of the plurality of the information storage media by striping the data, and records, in at least one parity block, at least one parity data for use in recovering data in the data block, among the plurality of data blocks, in which the data is missing,
an area information recording section which records, in a case where recording has failed in at least one of the drive devices at a time of recording the data, the recording failure area information in the management information area of at least one of the information storage media, and
a reproduction control section which invalidates data read from the recording failure area, based on the recording failure area information, and reproduces data in the recording failure area with use of the at least one parity data, wherein
the management information area further includes array management information for managing a recording state of the disk array,
the array management information includes:
array type information for identifying a recording system of the disk array,
array component number information indicating how many of the information storage media are included in the disk array,
array number information indicating an ordinal number of the respective information storage media in the disk array, and
an array configuration information table relating to all the information storage media of the disk array, in which the array number of the respective information storage media included in the disk array, and a medium identification number for uniquely identifying the respective information storage media are correlated with each other,
the control section further includes an information acquiring section which acquires the array management information recorded in the management information area at least at a timing when the drive device loaded with the information storage medium is started up, and
the reproduction control section controls the plurality of the drive devices, based on the acquired array management information.

7. The information processing device according to claim 1, wherein
the control section further includes an information acquiring section which acquires the recording failure area information from the management information area.

8. The information processing device according to claim 1, wherein
the recording failure area includes at least one of a data block in which a recording error has occurred, and a data block in which the data has not been recorded.

9. A portable information storage medium among a plurality of portable information storage media included in a disk array for recording data, the portable information storage medium comprising:
a user area including a plurality of data blocks for recording the data; and
a management information area in which recording failure area information is recorded, the recording failure area information including: information indicating which information storage medium, among the plurality of the information storage media of the disk array, has a recording failure area in which the data is missing; and information indicating a position of the recording failure area in the information storage medium that has the recording failure area, wherein
the data obtained by striping and being stored in the plurality of the information storage media, and parity data for use in recovering data in the data block, among the plurality of data blocks, in which the data is missing are recorded in the user area, the management information area further includes array management information for managing a recording state relating to the disk array, the array management information includes:
- array type information for identifying a recording system of the disk array,
- array component number information indicating how many of the information storage media are included in the disk array,
- array number information indicating an ordinal number of the respective information storage media in the disk array, and
- an array configuration information table relating to all the information storage media of the disk array, in which the array number of the respective information storage media included in the disk array, and a medium identification number for uniquely identifying the respective information storage media are correlated with each other, and the array management information is recorded in the management information area at a timing when an initialization processing for configuring the disk array is performed.

10. A portable information storage medium among a plurality of portable information storage media included in a disk array for recording data, the portable information storage medium comprising:
- a user area including a plurality of data blocks for recording the data; and
- a management information area in which recording failure area information is recorded, the recording failure area information including: information indicating which information storage medium, among the plurality of the information storage media of the disk array, has a recording failure area in which the data is missing; and information indicating a position of the recording failure area in the information storage medium that has the recording failure area, wherein the data obtained by striping and being stored in the plurality of the information storage media, and parity data for use in recovering data in the data block, among the plurality of data blocks, in which the data is missing are recorded in the user area, data read from the recording failure area is invalidated, based on the recording failure area information, and data in the recording failure area is reproduced with use of the parity data, the management information area further includes array management information for managing a recording state of the disk array, the array management information includes:
- array type information for identifying a recording system of the disk array,
- array component number information indicating how many of the information storage media are included in the disk array,
- array number information indicating an ordinal number of the respective information storage media in the disk array, and
- an array configuration information table relating to all the information storage media of the disk array, in which the array number of the respective information storage media included in the disk array, and a medium identification number for uniquely identifying the respective information storage media are correlated with each other, the array management information is acquired from the management information area at least at a timing when the drive device loaded with the information storage medium is started up, and the data is produced, based on the acquired array management information, from each of the plurality of the information storage media.

* * * * *